United States Patent [19]

Ogino

[11] Patent Number: 5,771,103
[45] Date of Patent: Jun. 23, 1998

[54] IMAGE FORMING APPARATUS PERFORMING INTERRUPTION PROCESS IN ELECTRONIC SORTING MODE

[75] Inventor: Noboru Ogino, Kawasaki, Japan

[73] Assignee: Kabushiki Kaisha Toshiba, Kanagawa-ken, Japan

[21] Appl. No.: 702,255

[22] Filed: Aug. 23, 1996

[30] Foreign Application Priority Data

Aug. 31, 1995 [JP] Japan .................................. 7-223822

[51] Int. Cl.⁶ .................................................... H04N 1/00
[52] U.S. Cl. ............................ 358/437; 399/87; 399/410
[58] Field of Search .................................. 358/437, 438, 358/436, 439, 468, 467, 296; 355/114, 127, 89; 399/87, 407, 408, 410

[56] References Cited

U.S. PATENT DOCUMENTS

| | | | |
|---|---|---|---|
| 4,008,957 | 2/1977 | Summers | 355/14 |
| 4,090,787 | 5/1978 | Hubbard et al. | 355/14 |
| 4,907,031 | 3/1990 | Kawatsura et al. | 355/206 |
| 5,200,830 | 4/1993 | Imaizumi et al. | 358/437 |
| 5,262,851 | 11/1993 | Nakatani et al. | 358/437 |
| 5,266,996 | 11/1993 | Wakamiya et al. | 358/437 |
| 5,357,347 | 10/1994 | Hirose et al. | 358/296 |
| 5,546,164 | 8/1996 | Hayashi et al. | 355/204 |

*Primary Examiner*—Edward L. Cole, Sr.
*Assistant Examiner*—Madeleine A. V. Nguyen
*Attorney, Agent, or Firm*—Limbach & Limbach, LLP

[57] ABSTRACT

An image forming apparatus arranged to form and output a plurality of images of a plurality of original documents onto a plurality of sheets in an electronic sorting mode and having a control unit for controlling an image forming mechanism in such a manner that standby is performed during an operation for printing for each unit of groups of the sheets even if an instruction to perform interruption printing is issued, and the interruption printing process is performed after the group unit printing has been completed.

20 Claims, 29 Drawing Sheets

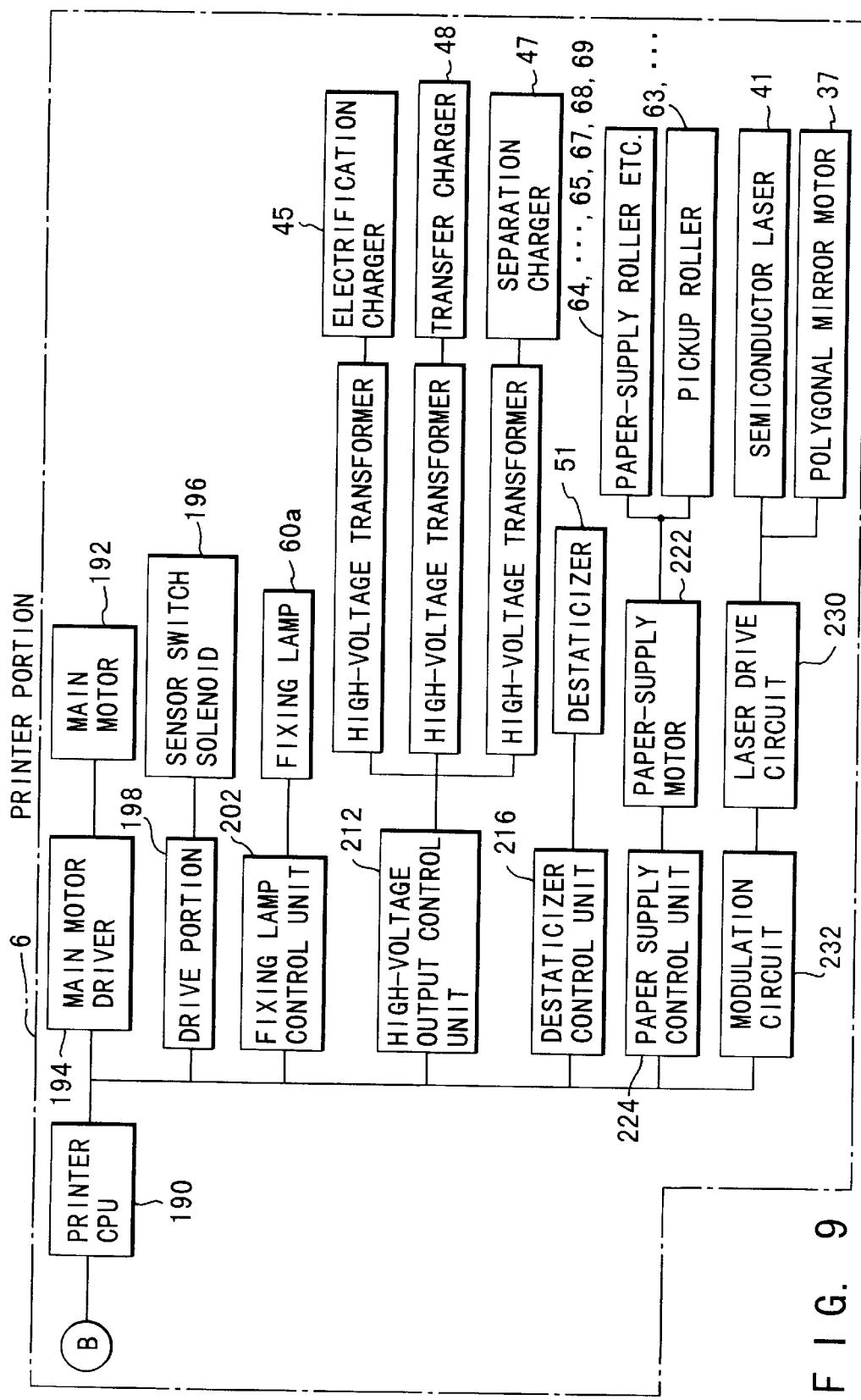
F I G. 9

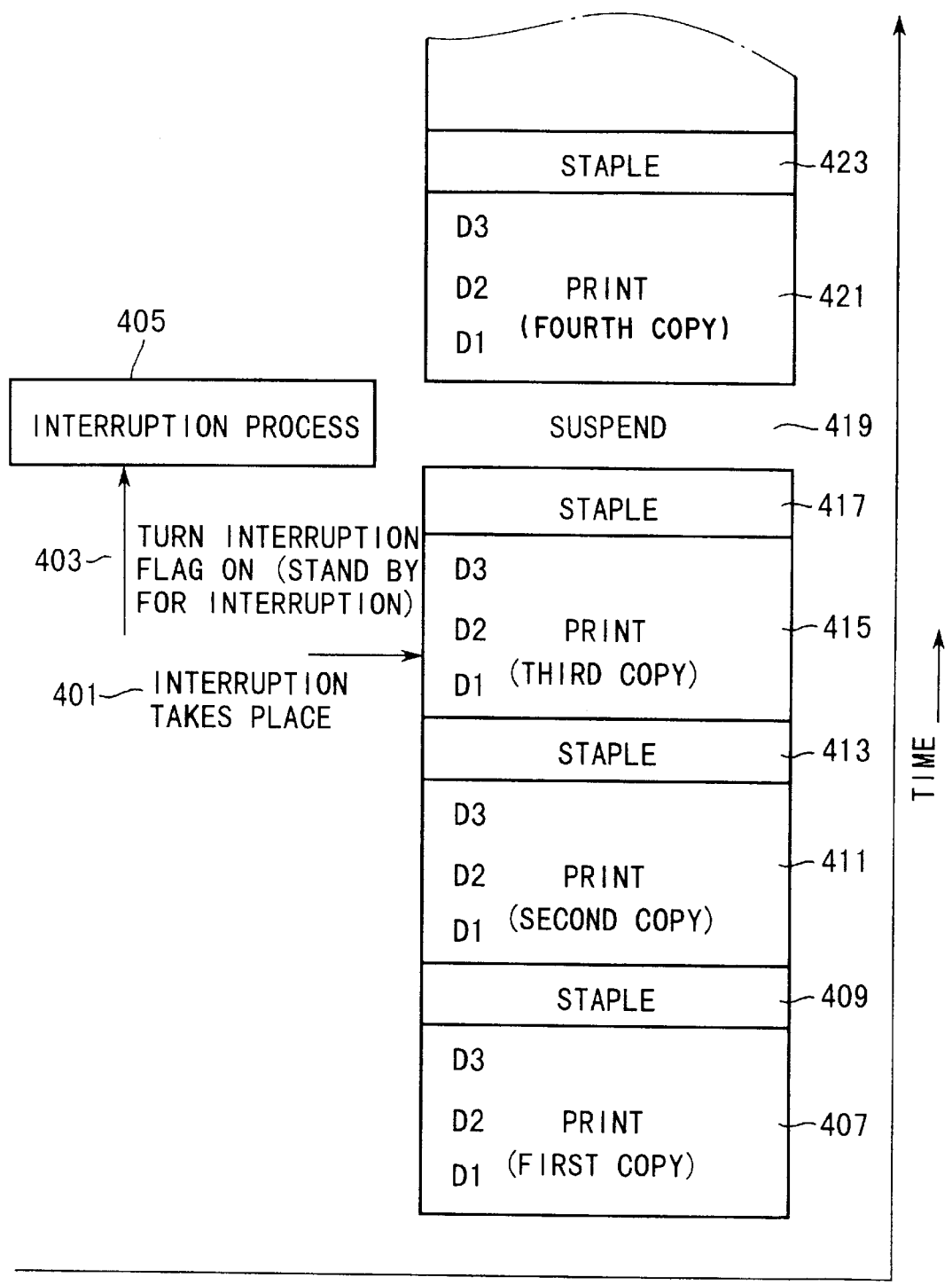
F I G.  1 2 B

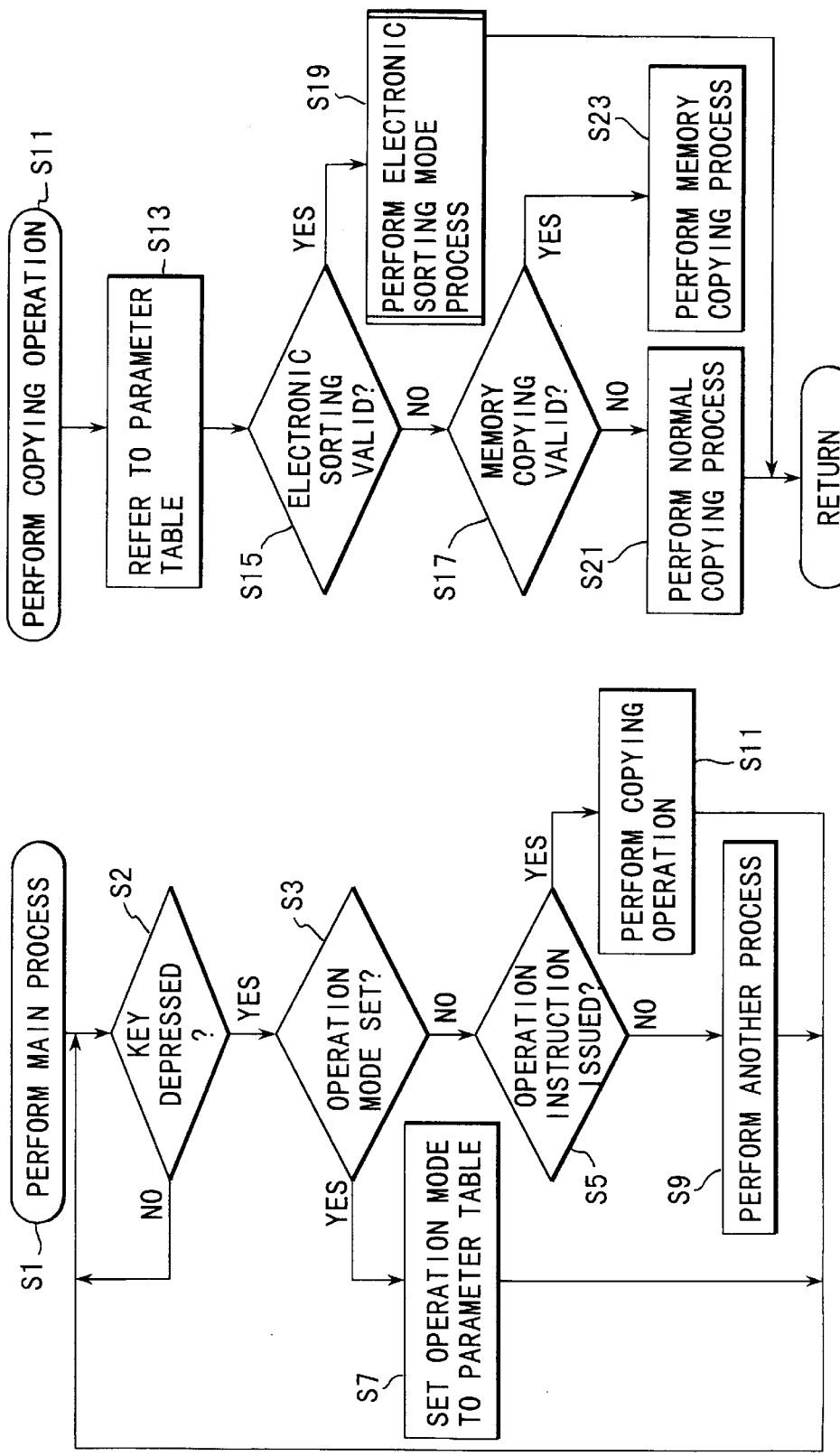

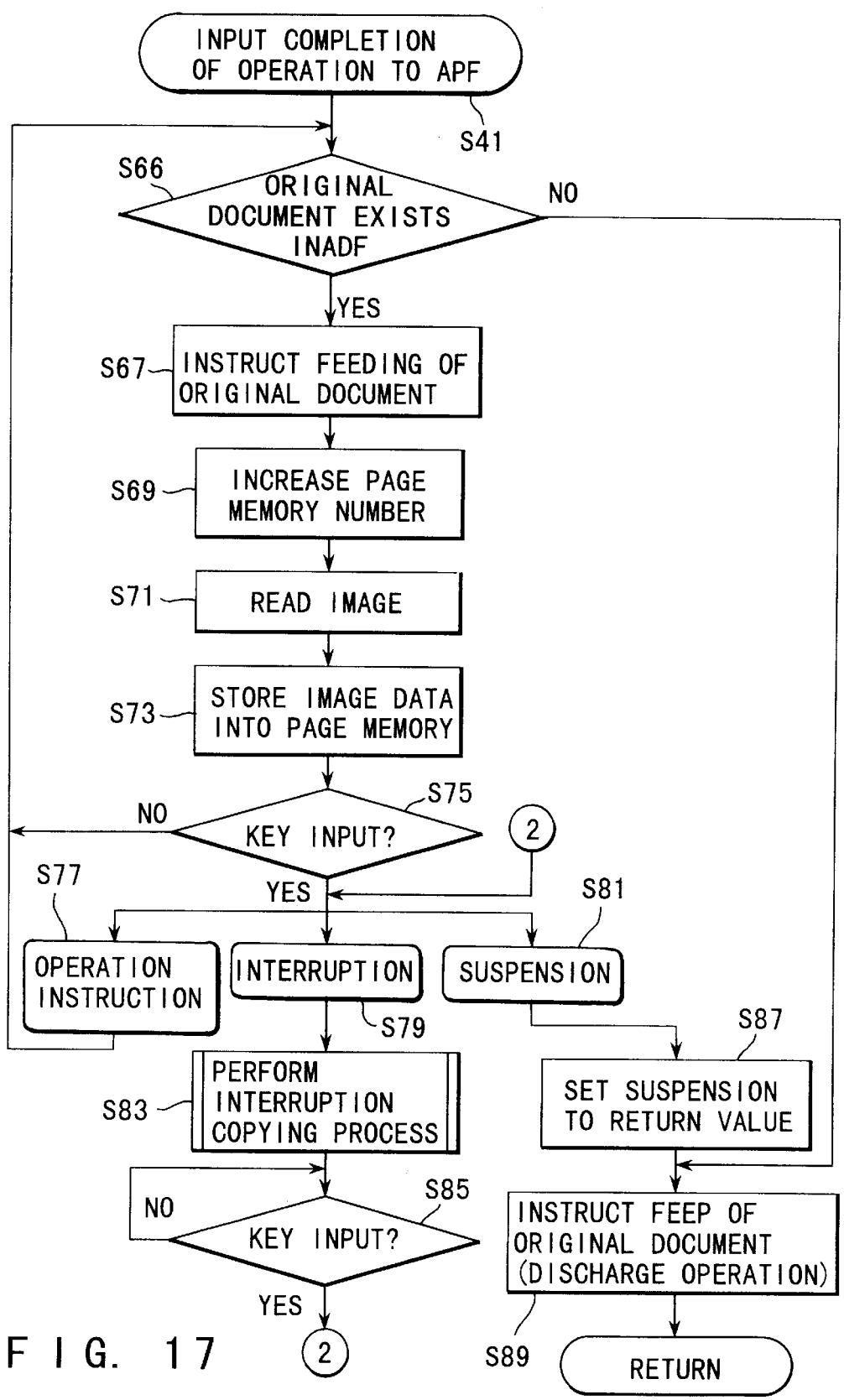
F I G. 17

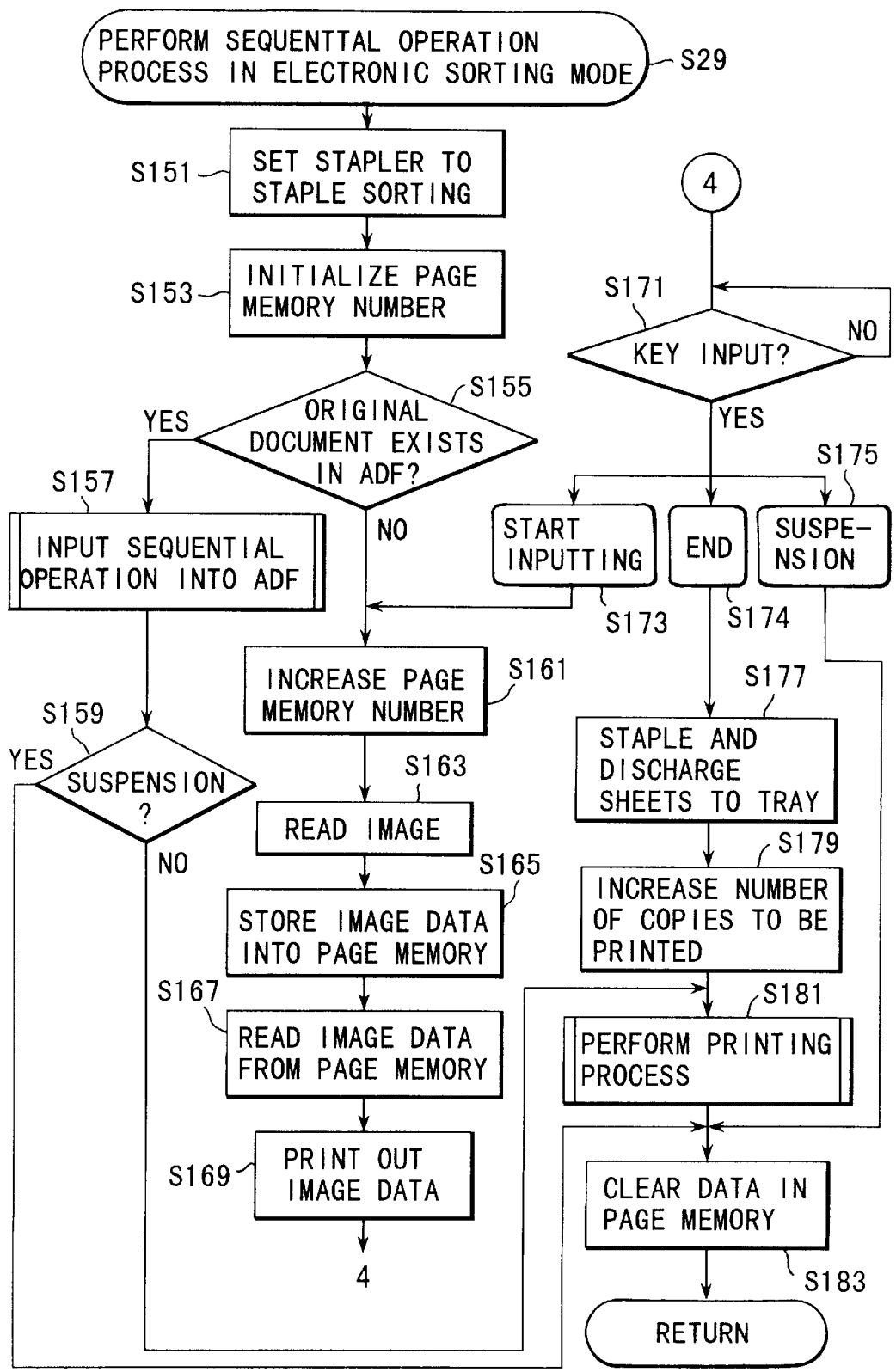
F I G. 20

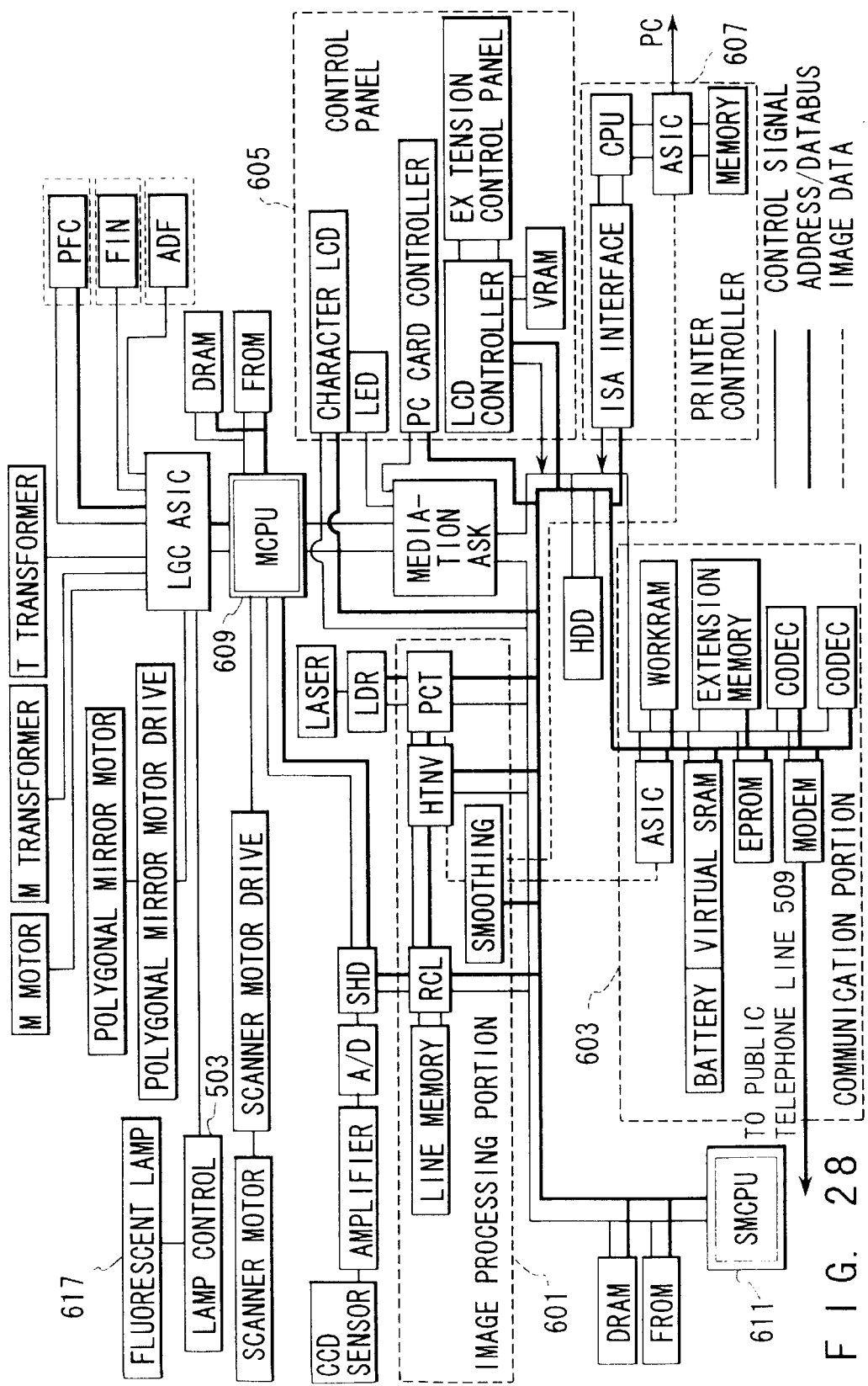
F I G. 28

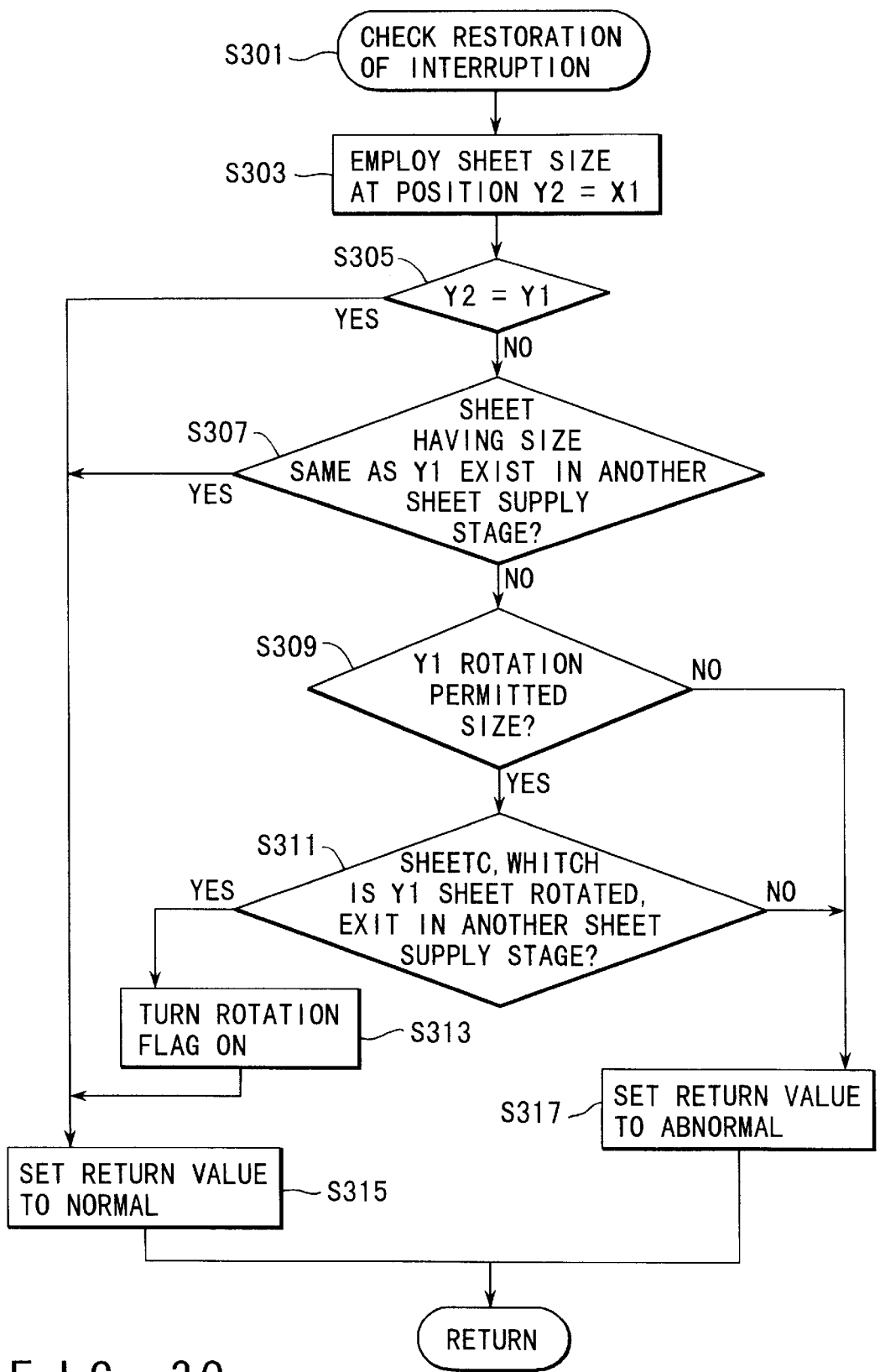
F I G. 30

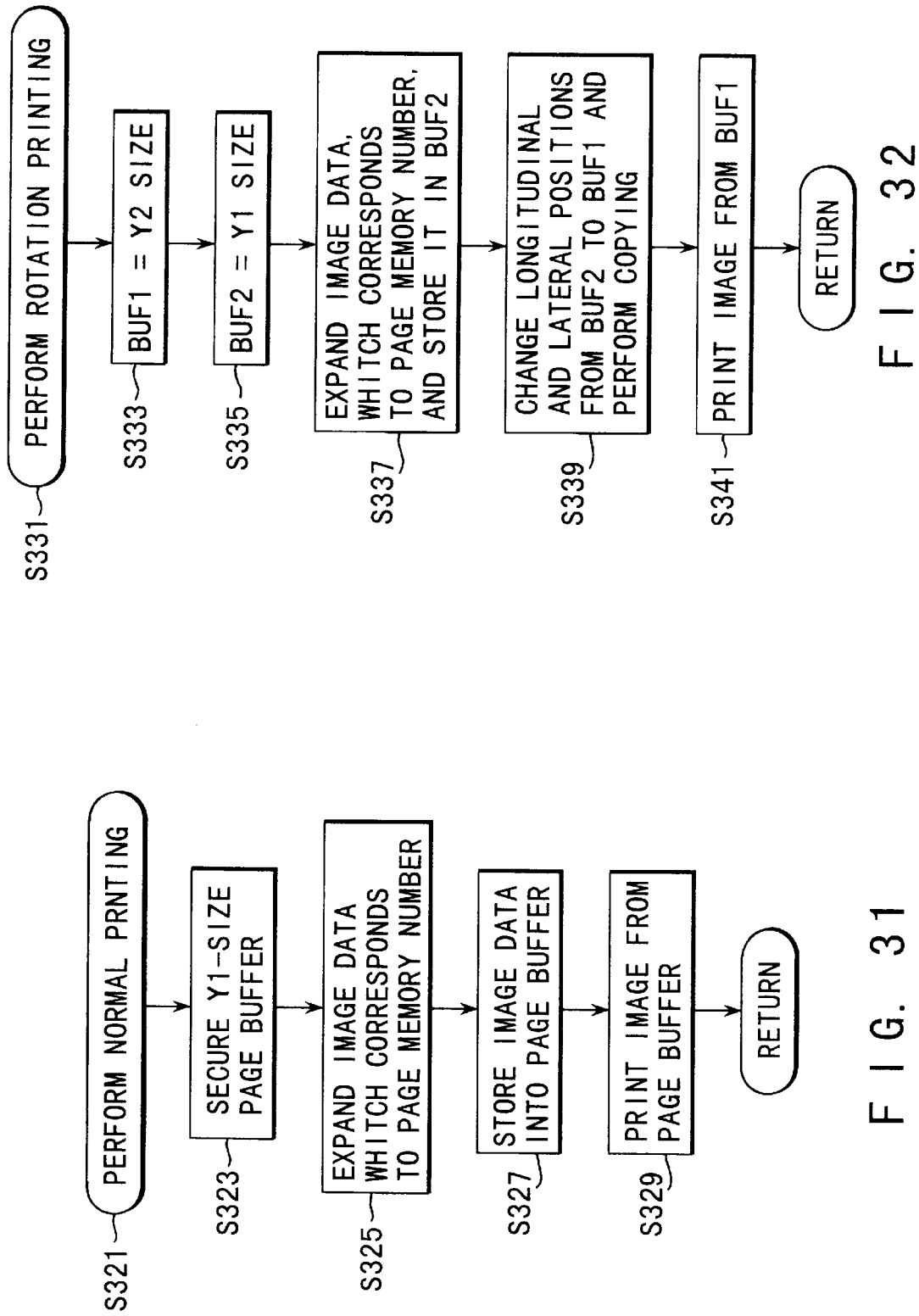

IMAGE FORMING APPARATUS PERFORMING INTERRUPTION PROCESS IN ELECTRONIC SORTING MODE

BACKGROUND OF THE INVENTION

1. Field of the Invention

The present invention relates to an image forming apparatus, such as a digital copying machine, arranged to store images of a plurality of original documents into a page memory thereof, sequentially copy the plurality of the stored images on the sheets in an electronic sorting mode to obtain a plurality of copied sheets of the plural original documents and staple the obtained sheets of each copy, the image forming apparatus being capable of performing an interruption process.

2. Description of the Related Art

A digital copying machine has been put into practical use, the machine comprising a finisher having a stapler function, to be performed on a single tray, and which is capable of performing an interruption copying operation in an electronic staple sorting mode.

In a case where the interruption copying operation is instructed during the electronic staple sorting mode which is being performed by the foregoing digital copying machine, sheets copied to follow the instruction to perform the interruption copying operation are, on the same tray, unintentionally discharged onto sheets which have been discharged due to the staple sorting mode. Thus, there arises a possibility that the interruption-copied sheets are unintentionally stapled together with the sheets copied due to the staple sorting mode when the interruption process has been completed and the staple operation is intended to be again performed. Moreover, there arises another problem in that the sheets arranged to be stapled are disordered when the interruption-copied sheets are taken from the tray.

SUMMARY OF THE INVENTION

An object of the present invention is to provide a digital copying machine capable of performing an interruption process without disorder of the copying process in a sorting mode if interruption copying instruction is issued during the electronic sorting mode process.

According to the present invention, there is provided an image forming apparatus comprising: means for storing a plurality of first images; means for forming images so that images are, in a sorting mode, formed on a plurality of image forming mediums in accordance with the plurality of the stored first images to output the formed images, the image forming means forming the first images on the plural image forming mediums into a plurality of groups each consisting of a predetermined number of mediums so as to output in such a manner that the groups are repeated by plural times; means for supplying an instruction so that the image forming means performs an interruption process which is forming a second image; and means for controlling the image forming means corresponding to the instruction so that standby for the interruption process is performed during output of one of the plural groups, and forming of the plural first images is suspended and then the forming of the second image is performed after the output has been completed.

The present invention having the foregoing structure is able to realize an electronic sorting mode printing operation without any problem if an interruption process is performed during the printing operation in the electronic sorting mode. That is, the conventional structure has an arrangement such that the interruption process is immediately performed when the interruption instruction is issued even if the electronic sorting mode printing operation is being performed. Thus, the sheets are interruption-printed and discharged into a tray into which the sheets obtained by the electronic sorting mode operation have been discharged. Therefore, the operator, who has performed the interruption, is required to reliably remove the interruption sheets. Thus, there is a risk that the arranged sheets printed in the electronic sorting mode are disordered. If the removal is not performed, there arises a problem in that the interruption sheets are mixed with the sheets printed in the electronic sorting mode or stapled together with the same.

However, the present invention has the structure such that the interruption is not performed and standby for the same is performed until one group (for example, three sheets forming an original document to be printed in the sorting mode) in a sorting mode printing operation is printed out. Then, when output of the one group has been completed, the interruption process is performed. Therefore, unintentional mixture of the group of the sheets obtained by the electronic sorting mode printing operation and the sheets printed due to the interruption printing operation can be prevented. If the electronic sorting mode printing operation and a stapling operation are performed simultaneously, the interruption printing operation is allowed to start after the process for stapling one group has been completed. Thus, a problem taking place in that sheets obtained by the electronic sorting mode printing operation and the sheets obtained due to the interruption printing operation are unintentionally stapled collectively can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 9 is a block diagram showing the schematic structure of a printer portion;

FIG. 12B is a timing chart showing the relationship between a delay interruption operation, which is a characteristic of the present invention, and an electronic sorting mode process;

FIG. 13 is a flow chart for explaining a main process;

FIG. 14 is a flow chart for explaining a copying operation;

FIG. 17 is a flow chart for explaining a process for inputting completion of the operation to the ADF;

FIG. 20 is a flow chart for explaining an electronic sorting mode sequential process;

FIG. 24 is a flow chart for explaining an electronic sorting mode printing process according to the second embodiment and to be performed when the delay interruption is displayed by turning an exclusive LED on;

FIG. 28 is a block diagram showing a digital copying machine according to the fourth embodiment and having a mechanism for receiving the interruption instruction through the telephone line;

FIG. 30 is a flow chart showing a sub-routine of an operation according to the fifth embodiment for checking restoration from interruption;

FIG. 31 is a flow chart showing a sub-routine of a normal printing process according to the fifth embodiment;

FIG. 32 is flow chart showing a sub-routine of a rotation printing process according to the fifth embodiment.

DETAILED DESCRIPTION OF THE PREFERRED EMBODIMENTS

A preferred embodiment of the present invention will now be described with reference to the drawings.

That is, a composite type image forming apparatus having three functions to serves as a copying machine (PPC), a facsimile machine (FAX) and a printer (PRT) will now be described.

Figure 1:
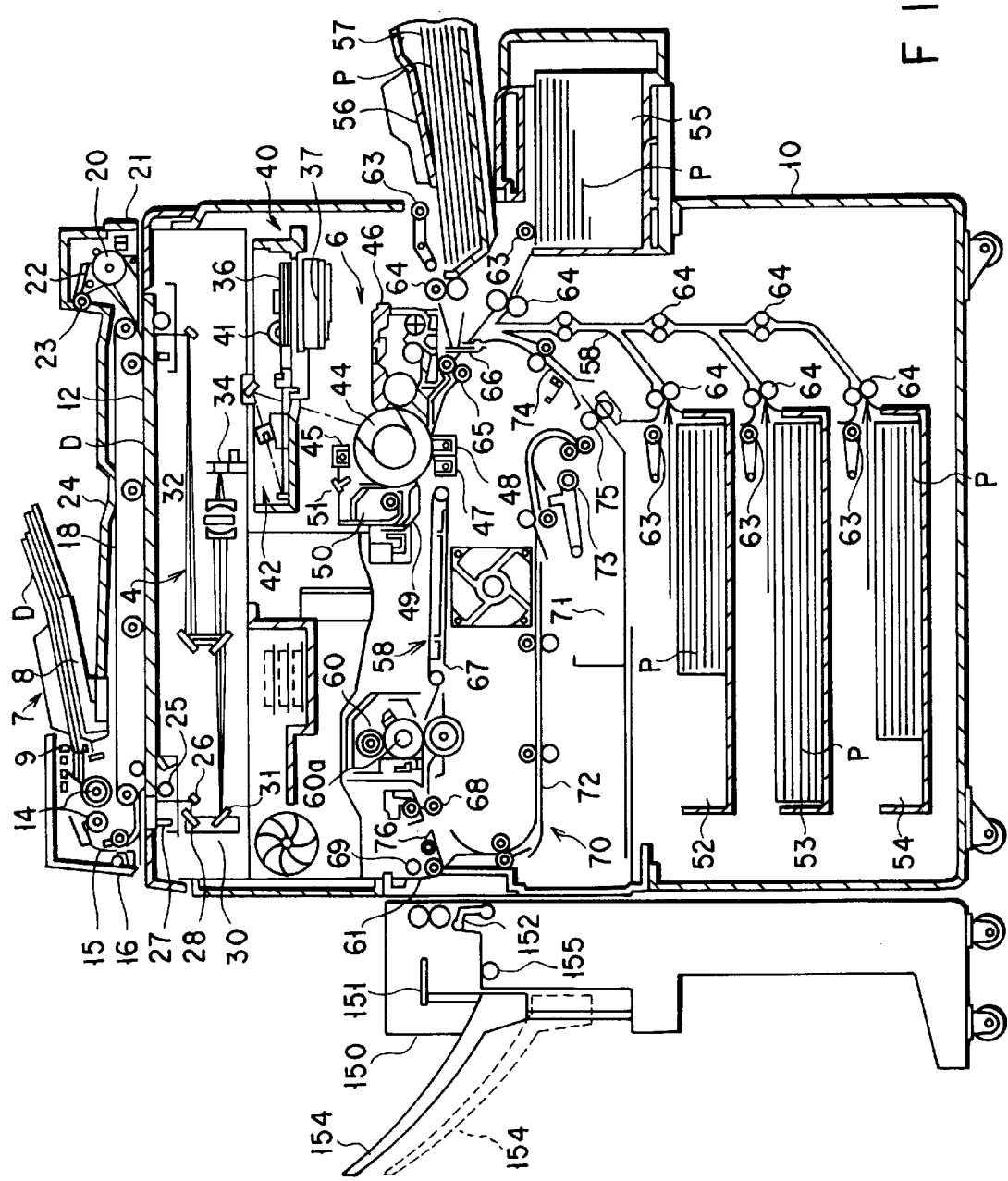
FIG. 1 is a diagram showing the schematic structure of a digital copying machine according to an embodiment of the present invention.

FIG. 1 is a schematic block diagram showing the internal structure of a digital copying machine which is an embodiment of the image forming apparatus according to the present invention.

As shown in FIG. 1, the digital copying machine comprises a body 10. The body 10 includes a scanner portion 4 serving as a reading means to be described later and a printer portion 6 serving as an image forming means.

An original-document retainer frame 12 is formed on the top surface of the body 10, the original-document retainer frame 12 comprising a transparent glass plate on which a subject to be read, that is, original document D is placed. An automatic original document feeding apparatus (hereinafter called as an "ADF") 7 for automatically feeding the original document onto the original-document retainer frame 12 is disposed on the top surface of the body 10. The ADF 7 is capable of opening and closing with respect to the original-document retainer frame 12 so as to serve as an original-document retainer for causing the original document D placed on the original-document retainer frame 12 to be in close contact with the original-document retainer frame 12.

The ADF 7 comprises an original-document tray 8 into which the original document D is set, an empty sensor 9 for detecting the original document D, a pickup roller 14 for sequentially fetching the original document sheets from the original-document tray 8, a sheet supply roller 15 for conveying the original document sheets, an aligning roller pair 16 for aligning the leading ends of the original document sheets and a conveyance belt 18 disposed to cover substantially the overall body of the original-document retainer frame 12. The original document consisting of a plurality of sheets set to face upwards in the original-document tray 8 are sequentially fetched such that the lowermost page, that is, the final page is fetched first. The original document sheets are aligned by the aligning roller pair 16, and then conveyed to a predetermined position on the original-document retainer frame 12.

In the ADF 7, a reverse roller 20, a non-reversion sensor 21, a flapper 22 and a sheet discharge roller 23 are disposed at ends opposite to the aligning roller pair 16 while interposing the conveyance belt 18. The original document D, from which image information has been read by a scanner portion 4, to be described later, is moved from the top surface of the original-document retainer frame 12 by the conveyance belt 18, and then discharged to the upper surface of a original-document discharge portion 24 on the upper surface of the ADF 7 through the reverse roller 20, the non-reversion sensor 21 and the flapper 22. In a case where the reverse side of the original document D is read, the flapper 22 is switched so that the original document D conveyed by the conveyance belt 18 is reversed by the reverse roller 20. Then, the original document D is returned to a predetermined position on the original-document retainer frame 12 by the conveyance belt 18.

The scanner portion 4 in the body 10 comprises an exposure lamp 25 serving as a light source for irradiating the original document D placed on the original-document retainer frame 12 and a first mirror 26 for deflecting light reflected by the original document D into a predetermined direction. The exposure lamp 25 and the first mirror 26 are attached to a first carriage 27 disposed below the original-document retainer frame 12.

The first carriage 27 is disposed so as to be capable of moving in parallel to the original-document retainer frame 12 such that the first carriage 27 reciprocates below the original-document retainer frame 12 by a drive motor through a toothed belt or the like (not shown).

A second carriage 28 capable of moving in parallel to the original-document retainer frame 12 is disposed below the original-document retainer frame 12. Second and third mirrors 30 and 31 for sequentially deflecting light reflected by the original document D and deflected by the first mirror 26 are attached to the second carriage 28, the first and second mirrors 30 and 31 being attached perpendicularly to each other. The second carriage 28 is operated to follow the first carriage 27 by a toothed belt or the like for operating the first carriage 27, the second carriage 28 being moved in parallel to the original-document retainer frame 12 at speed which is half the speed of the first carriage 27.

An image forming lens 32 for converging light reflected by a third mirror 31 on the second carriage 28 and a CCD sensor 34 for receiving reflected light converged by the image forming lens 32 so as to photoelectrically convert light are disposed below the original-document retainer frame 12. The image forming lens 32 is, through a drive mechanism, movably disposed in a plane including the optical axis for light deflected by the third mirror 31. When the image forming lens 32 is moved, reflected light is focused at a predetermined magnification. The CCD sensor 34 photoelectrically converts reflected light which has been made incident upon the CCD sensor 34 so as to output an electric signal corresponding to read original document D.

On the other hand, the printer portion 6 has a laser exposure unit 40 serving as a latent image forming means. The laser exposure unit 40 has a semiconductor laser 41 serving as a light source, a polygonal mirror 36 serving as a scanning member for continuously deflecting laser beams emitted from the semiconductor laser 41, a polygonal mirror motor 37 serving as a scanning motor for rotating the polygonal mirror 36 at a predetermined revolving speed to be described later, and an optical system 42 for deflecting the laser beam deflected by the polygonal mirror 36 to introduce the laser beam to a photosensitive drum 44. The laser exposure unit 40 having the foregoing structure is secured and supported by a support frame (not shown) of the body 10.

The semiconductor laser 41 is turned on or off in accordance with image information of the original document D read by the scanner portion 4 or information of a document to be transmitted or received by the facsimile function. The laser beam emitted from the semiconductor laser 41 is, through the polygonal mirror 36 and the optical system 42, directed to the photosensitive drum 44 to scan the surface of the photosensitive drum 44. As a result, an electrostatic latent image is formed on the surface of the photosensitive drum 44.

The printer portion 6 has a rotative photosensitive drum 44 serving as an image carrier disposed at the substantially central portion of the body 10. The surface of the photosensitive drum 44 is exposed to the laser beam emitted from the laser exposure unit 40 so that a required electrostatic latent image is formed. Around the photosensitive drum 44, there are disposed an electrification charger 45 for charging the surface of the photosensitive drum 44 to have a predetermined charge. Moreover, the following units are disposed: a development unit 46 for supplying toner, which is a developer, to the electrostatic latent image formed on the surface of the photosensitive drum 44 to develop the electrostatic latent image with a required image density; and a transfer charger 48 integrally having a separation charger 47 for separating, from the photosensitive drum 44, a member, to which the image is transferred, and which has been supplied from a sheet cassette to be described later, that is, copying sheet P, the transfer charger 48 being arranged to transfer the toner image formed on the photosensitive drum 44 to the sheet P. In addition, a separation claw 49 for separating the copy sheet P from the surface of the photosensitive drum 44, a cleaning unit 50 for cleaning toner left on the surface of the photosensitive drum 44 and a destaticizer 51 for destaticizing the surface of the photosensitive drum 44 are disposed. The foregoing units are disposed in the foregoing sequential order.

In the lower portion of the body 10, an upper cassette 52, a middle cassette 53 and a lower cassette 54, each of which can be drawn from the body 10, are disposed in a stacked state. The cassettes 52, 53 and 54 accommodate copying paper sheets having different sizes. A large-capacity feeder 55 is disposed on the side of the cassettes 52, 53 and 54. The large-capacity feeder 55 accommodates about 3,000 sheets of copying paper P having, for example, A4-size, which is frequently used. A paper feeding cassette 57 also serving as a manual sheet feeding tray 56 is disposed above the large-capacity feeder 55.

In the body 10, a conveyance passage 58 is formed from each cassette and the large-capacity feeder 55 to pass through a transference portion formed between the photosensitive drum 44 and the transfer charger 48, and then again extends. At the ends of the conveyance passage 58, a fixing unit 60 having a fixing lamp 60a is disposed. On the side wall of the body 10 opposite to the fixing unit 60, a discharge port 61 is formed. A single tray finisher 150 is attached to the discharge port 61.

In the vicinity of the upper cassette 52, the middle cassette 53, the lower cassette 54, the paper supply cassette 57, a large-capacity feeder 55 and pickup rollers 63 for, one by one, picking up the copying paper P from the cassette or the large-capacity feeder are disposed. A multiplicity of paper feeding roller pairs 64 for, through the conveyance passage 58, conveying the copying paper P extracted from the pickup roller 63 are disposed in the conveyance passage 58.

In the conveyance passage 58, a resist roller pair 65 is disposed upstream from the photosensitive drum 44. The resist roller pair 65 corrects the inclination of the extracted copying paper P and aligns the leading end of the toner image on the photosensitive drum 44 and the leading end of the copying paper P to each other, and then supplies the copying paper P to the transference portion at the same speed as the rotational speed of the photosensitive drum 44. In front of the resist roller pair 65, that is, at a position near the paper supply roller 64, a prealignment sensor 66 is disposed to detect arrival of the copying paper P.

The copying paper P, one by one, extracted from each cassette or the large-capacity feeder 55 by the pickup roller 63, is moved from the paper supply roller pairs 64 to the resist roller pair 65. Then, the leading end of the copying paper P is aligned by the resist roller pair 65, and then transferred to the transference portion.

In the transference portion, a developer image formed on the photosensitive drum 44, that is, the toner image is transferred onto the copying paper P by the transfer charger 48. The copying paper P, to which the toner image has been transferred, is separated from the surface of the photosensitive drum 44 by the operations of the separation charger 47 and the separation claw 49, and then conveyed to the fixing unit 60 through a conveyance belt 67 forming a portion of the conveyance passage 52. Then, the developer image is melted and fixed to the copying paper P by the fixing unit 60. Then, the copying paper P is allowed to pass through a discharge port 61 by a paper supply roller pair 68 and a paper discharge roller pair 69, and then discharged to the upper surface of the finisher 150.

An automatic double-side unit 70 is disposed below the conveyance passage 58 to reverse the copying paper P, allowed to pass through the fixing unit 60, to again supply the copying paper P to the resist roller pair 65. The automatic double-side unit 70 has a temporary collecting portion 71 for temporarily collecting the copying paper P; a reverse passage 72 branched from the conveyance passage 58 and arranged to reverse the copying paper P allowed to pass through the fixing unit 60; a pickup roller 73 for, one by one, extracting the copying paper P collected in the temporary collecting portion; and a paper supply roller 75 for allowing the extracted paper to pass through the conveyance passage 74 so as to supply the paper to the resist roller pair 65. An assigning gate 76 for selectively assigning the copying paper P to the discharge port 61 or the reverse passage 72 is disposed in a branched portion between the conveyance passage 58 and the reverse passage 72.

When a double-side copying operation is performed, the copying paper P allowed to pass through the fixing unit 60, is introduced into the reverse passage by the assigning gate 76. Thus, the copying paper P is, in a reversed state, temporarily collected in the temporary collecting portion 71, and then allowed to pass through the conveyance passage 74 by the pickup roller 73 and the paper supply roller pair 75 so as to be conveyed to the resist roller pair 65. Then, the copying paper P is aligned by the resist roller pair 65, and then again conveyed to the transference portion so that the toner image is transferred to the reverse side of the copying paper P. Then, the copying paper P is, through the conveyance passage 58, the fixing unit 60 and the discharge roller 69, discharged to the finisher 150.

Figure 2:
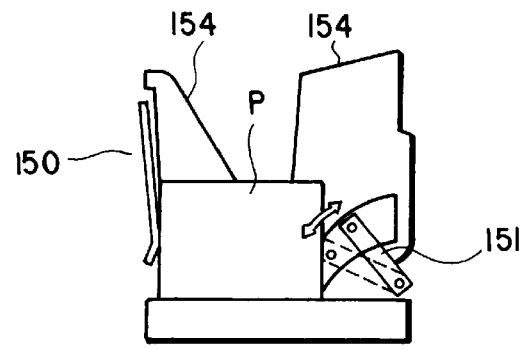
FIG. 2 is a diagram showing a finisher.
Figure 3:
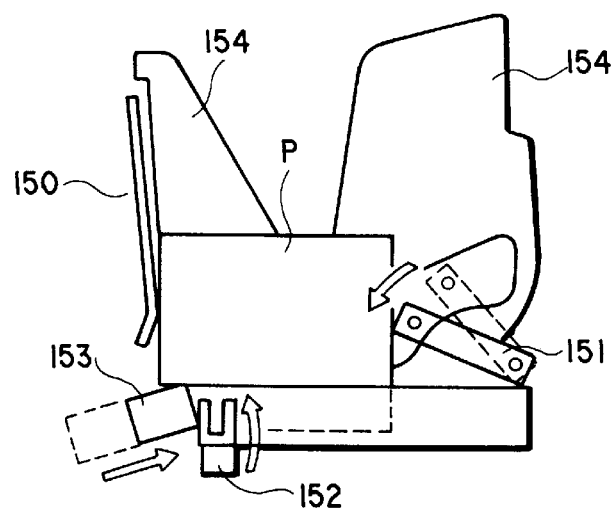
FIG. 3 is a diagram showing the finisher.
Figure 4:
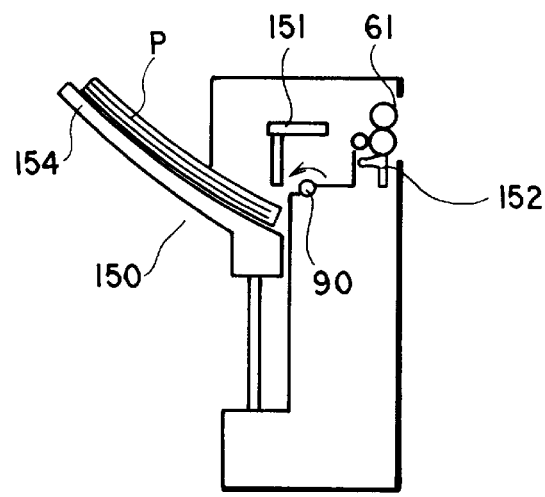
FIG. 4 is a diagram showing the finisher.

The finisher 150 staples each copy of the discharged document and collects the stapled copies. As shown in FIG. 2, whenever one sheet of the copying paper P to be stapled is discharged from the discharge port 61, the sheet is moved to the stapling portion by a guide bar 151 so as to be aligned. After all of the sheets have been discharged, a paper retaining arm 152 retains each copy of the discharged copying paper P, and then a stapler unit 153 staples the sheets. Then, the guide bar 151 is moved downwards to a position indicated by a dashed line shown in FIG. 3. Thus, the stapled copy of the copying paper P is discharged to a finisher discharge tray 154 by a finisher discharge roller 155 as shown in FIG. 4. The amount of the downward movement of the finisher discharge tray 154 is determined to a certain extent in accordance with the number of the sheets of the copying paper P so as to be moved downwards in a stepped manner whenever one copy is discharged. The guide bar 151 for aligning the copying paper P to be discharged is disposed at a vertical position determined not to come in contact with the stapled copying paper P which has been placed on the finisher discharge tray 154.

The finisher discharge tray 154 is connected to a shifting mechanism (not shown) arranged to be shifted (into, for example, four directions to the right, left, forwards and rearwards) corresponding to each copy in a sorting mode.

An operation panel 80 for inputting a variety of copying conditions and copy start signal for causing the copying operation to start is disposed in the upper portion of the front surface of the body 10.

Figure 5:
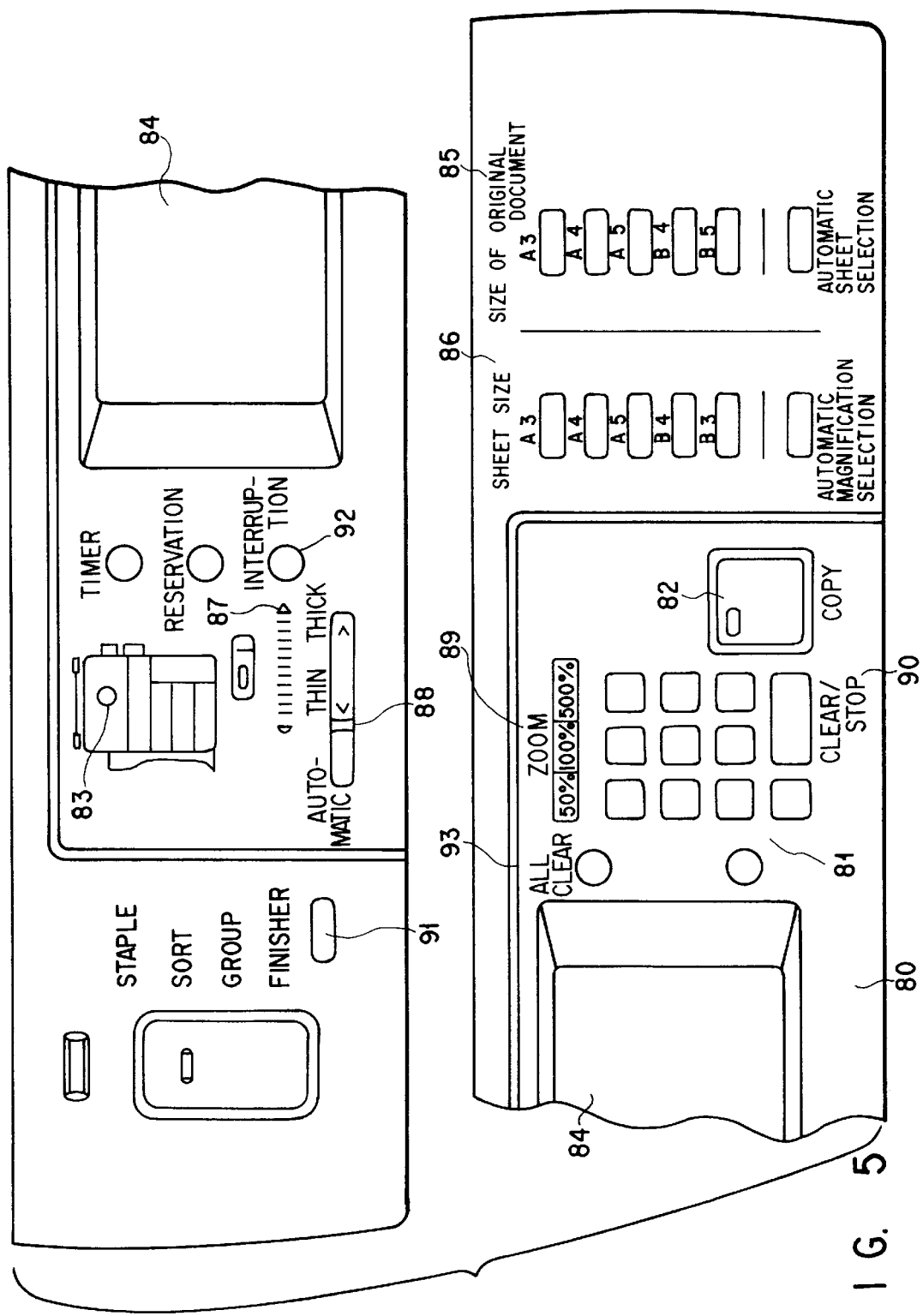
FIG. 5 is a plan view showing the structure of an operation panel.

As shown in FIG. 5, the operation panel 80 has a ten key pad 81, a copy key 82, a state display portion 83, a liquid crystal display portion 84, an original document size setting key 85, a paper-size setting key 86, a thickness display portion 87, a thickness setting key 88, a magnification setting key 89, a clear/stop key 90, a finisher key 91, an interruption key 92 and an all clear key 93.

The ten key pad 81 is used to set the number of the original document sheets and the number of the sheets to be copied.

The copy key 82 is used to instruct the copying operation to start.

The state display portion 83 guides and displays a state of selection of the paper feeding cassette, jam of the original document and the paper and the like.

The display portion 84 displays the number of the original document sheets and the number of sheets to be copied, the display portion 84 as well as displaying the copying magnification, factors required to perform an editorial operation and various operation guides. The liquid crystal display portion 84 has a touch panel with which a variety of operation instructions can be input. For example, an end key and a suspension key are displayed in the electronic sorting mode so as to instruct the end or the suspension of the operation.

The original document size setting key 85 is used to set the size of the original document D.

The paper-size setting key 86 is used to set the size of the paper P.

The thickness display portion 87 displays the copying thickness to be set by the thickness setting key 88.

The magnification setting key 89 is used to set the copying magnification.

The clear/stop key 90 is used to clear the contents set by using the ten key pad 81 to restore the standard state.

The finisher key 91 is used to set a staple mode, a sort mode and a group sort mode.

The interruption key 92 is a key for setting the interruption copying operation.

The all clear key 93 is a key with which suspension of the operation is instructed.

Referring to FIGS. 6 to 9, a circuit for controlling the image forming apparatus will now be described.

Figure 6:
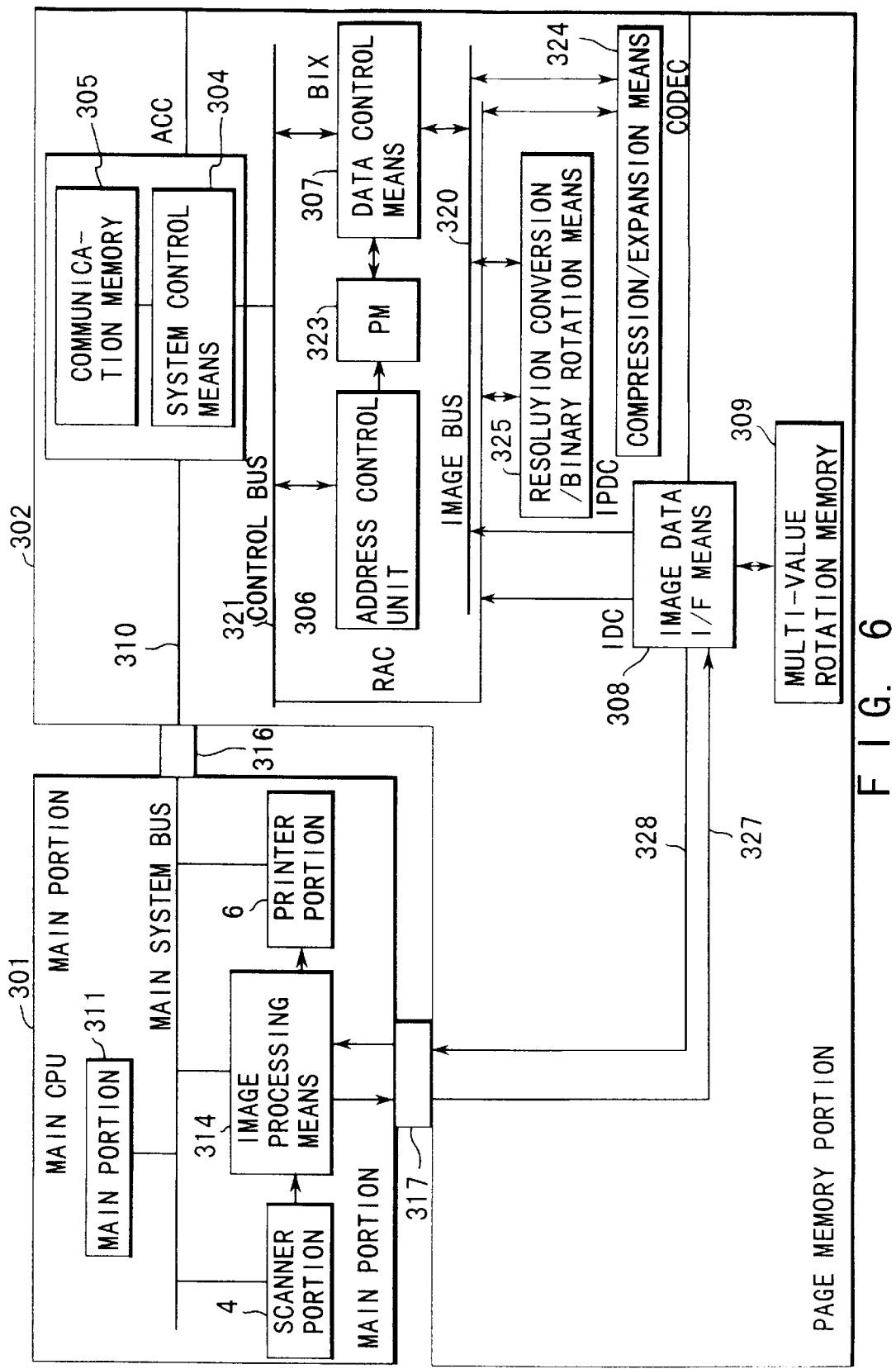
FIG. 6 is a block diagram showing the schematic structure of a system for controlling the digital copying machine.
Figure 7:
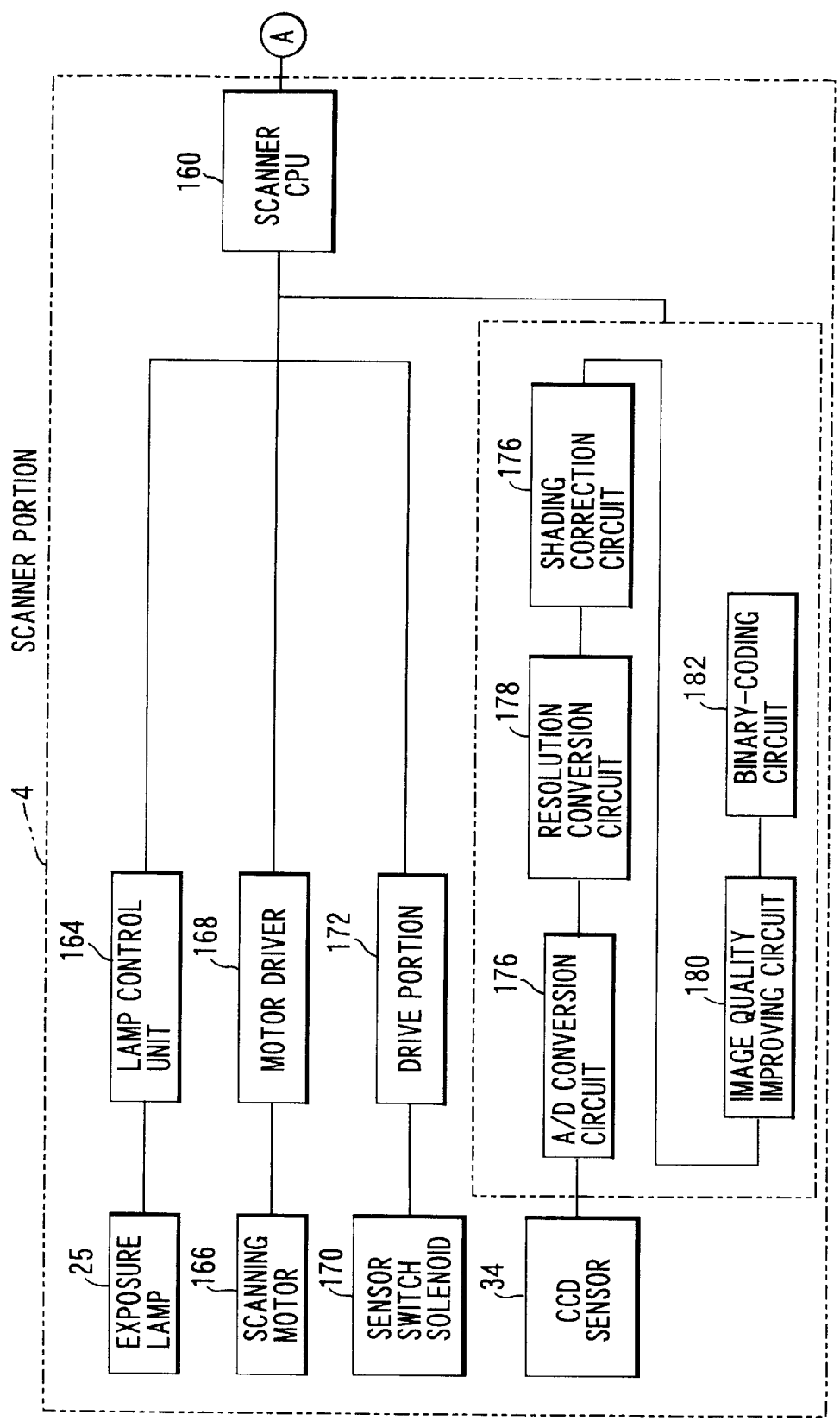
FIG. 7 is a block diagram showing the schematic structure of a scanner portion.
Figure 8:
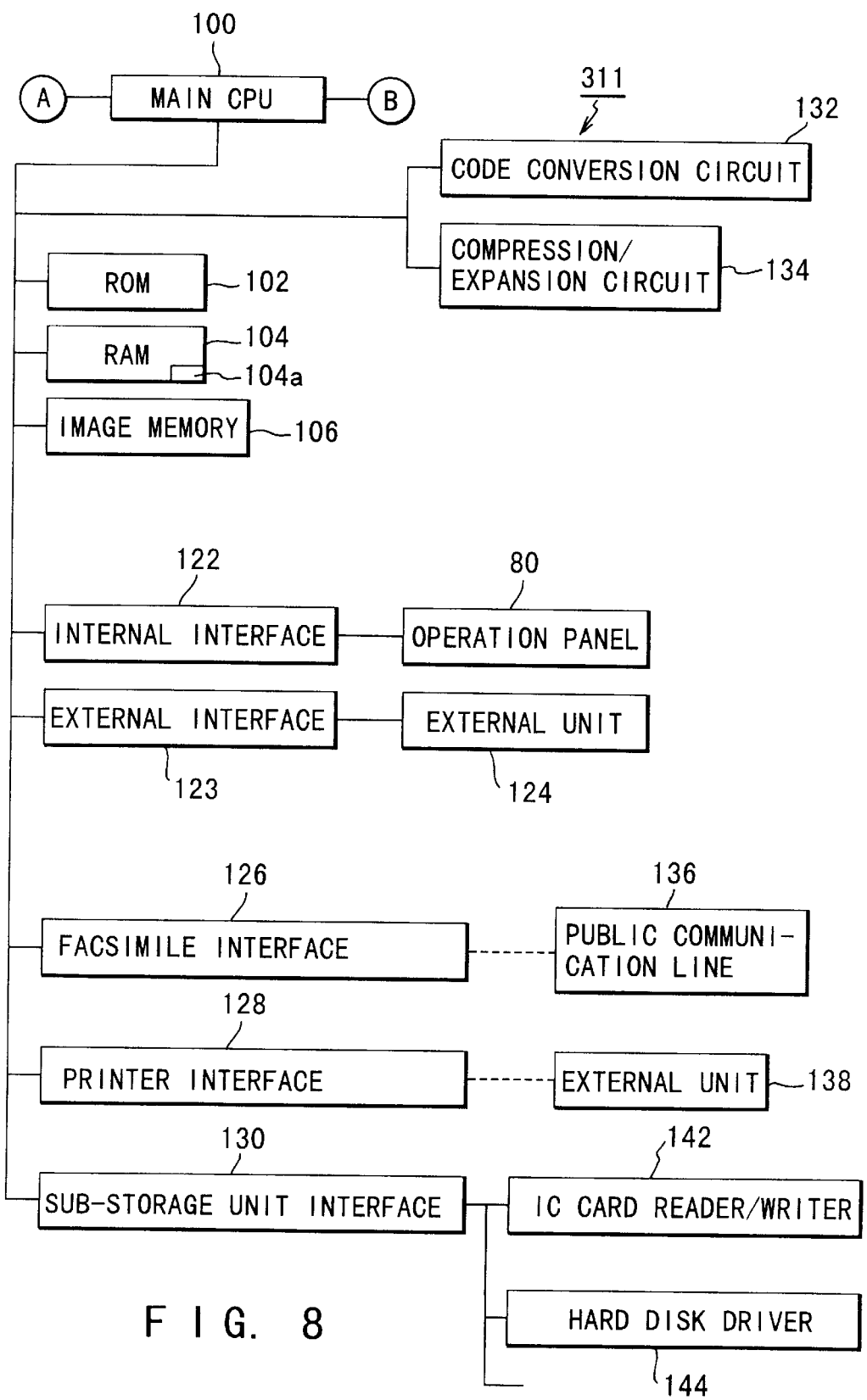
FIG. 8 is a block diagram showing the schematic structure of a central CPU.

FIG. 6 is a schematic block diagram showing the structure of a system for controlling the image forming apparatus, such as the digital copying machine, according the embodiment of the present invention. FIG. 7 shows the scanner portion, FIG. 8 shows a central CPU and FIG. 9 shows the printer portion.

The system for controlling the digital copying machine comprises two major blocks consisting of a central portion 301 having an image processing means 214 for establishing the connection between the scanner portion 4 and the printer portion 6 and forming the digital copying machine; and a page memory portion 302 for receiving image data from the central portion 301 and storing image data so as to again transfer stored image data to the central portion 301 so that a memory copying operation (an electronic sorting mode) is enabled.

The central portion 301 and the page memory portion 302 are connected to each other by a central portion system interface 316 for communicating control data and a central portion image interface 317 for communicating image data.

The central portion 301 consists of the input means (a scanner portion) 4, the output means (a printer portion) 6, the image processing means 314 and a control means (the central CPU) 311 for controlling the units above.

The control means (the central CPU) 311 has a main CPU 100 to which the following units are connected: a ROM 102, a RAM 104, an image memory 106, an internal interface 122, an external interface 123, a facsimile interface 126, a printer interface 128, a sub-storage-unit interface 130, a code conversion circuit 132 and a compression/expansion circuit 134. An external unit 124 is connected to the external interface 123, a public communication line 136 is connected to the facsimile interface 126, an external unit 138 is connected to the printer interface 128, and an IC card reader/writer 142, a hard disk drive 144 and so forth are connected to the sub-storage-unit interface 130.

Image information is stored/called by the main CPU 100. In a case where image information is stored for example, image information read by the scanner portion 4 under control of the scanner CPU 160 is stored in an image memory 106 to follow an instruction issued from the main CPU 100. The instruction from the main CPU 100 is performed in a state where the mode has been determined in accordance with an input performed with the operation portion (key input).

The RAM 104 is arranged to have a parameter table set thereto. The parameter table 104a is arranged to store copying conditions set with the operation panel 80 or the like. Specified values correspond to non-set conditions. The parameters for the copying conditions are the number of copies, the size of the original document, the size of the sheet, the magnification, the sorting mode, and the like.

Referring to FIG. 7, the detailed structure of the scanner portion 4 will now be described. An A/D conversion circuit 176, a resolution conversion circuit 178, a shading correction circuit 176, an image-quality improving circuit 180 and a binary-coding circuit 182 which are connected to a lamp control unit 164 for controlling the exposure lamp 25, a motor driver 168 for controlling the scanning motor 166 and a drive portion 172 for operating and controlling sensors, switches and solenoids 170 and which are arranged to process image information supplied from the CCD sensor 34 are connected to the scanner CPU 160 of the scanner portion 4 so as to be controlled by the scanner CPU 160.

Referring to FIG. 9, the printer portion 6 will now be described in detail. The printer portion 6 has a printer CPU 10 to which the following units are connected so as to be controlled: a main motor driver 194 for rotating a main motor 192; a drive portion 198 for operating and controlling sensors, switches and solenoids 196; a fixing lamp control unit 202 for controlling the fixing lamp 60a; a high-voltage output control unit 212 for controlling and applying high voltage supplied from a high-voltage transformers 213, 214 and 216 to the electrification charger 45, the transfer charger 48 and the separation charger 47; a destaticizer control unit 216 for controlling the destaticizer 51, a paper-supply control unit 224 for controlling the paper supply roller pairs 64 to 68, the resist roller pair 65, the conveyance belt 67 and a paper-supply motor 22 for the discharge roller pair 69 and a modulation circuit 323 for controlling a laser drive circuit 230 for the semiconductor laser 41 and the polygonal-mirror motor 37.

The page memory portion 302 will now be described with reference to FIG. 6. The page memory portion 302 has a system control means 304 for controlling the access from the central portion 301 to the page memory 323 and includes a communication memory 305; a storage means (a page memory) 323 for temporarily storing image data; an address control unit 306 for generating the address in the page memory 323; an image bus 320 for communicating data among the devices in the page memory portion 302; a control bus 321 for communicating controls signals among the devices in the page memory portion 302 and the system control means 304; a data control means 307 for controlling data transference when the data transference is performed between the page memory 323 and another device through the image bus 320; an image data I/F means 308 for interfacing image data when image data is communicated with the central portion 301 through the central portion image interface 317; a resolution conversion/binary rotation means 325 for converting the resolution into a resolution of another unit when image data is transmitted to the unit having the different resolution, converging the resolution of image data received from a unit having a different resolution into the resolution of the printer 315 of the central portion 301 and performing a 90-degree rotation process of binary-coded image data; a compression/expansion means 324 for compressing and transmitting supplied image data for a device for performing facsimile transmission or optical disk storage such that image is compressed so as to be transmitted or stored and expanding compressed image data to make the same visible through the printer 315; and a multi-value rotation memory 309 connected to the image data I/F means 308 and arranged to be used when image data is rotated by 90° or −90° when image data is printed out from the printer portion 6.

Figure 10:
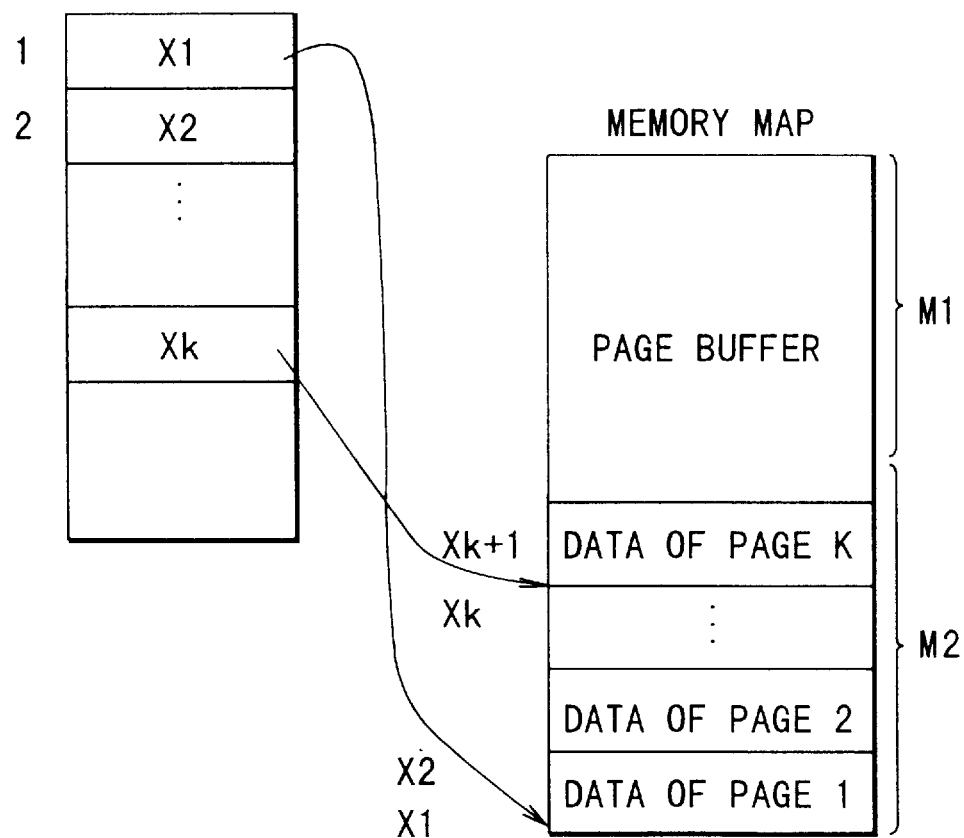
FIG. 10 is a diagram showing the relationship between a page buffer region M1 and a file area M2 of a page memory.

As shown in FIG. 10, the page memory 323 is sectioned into a page buffer region M1 on which image data of an original document read by the scanner portion 4 is written and a file area M2 on which data formed by compressing the foregoing image data is written and which is sectioned for each page.

The leading address of each page in the file area M2 is stored in data leading address storage region M3 for each file area page.

The electronic staple sorting mode will now be described with reference to FIGS. 11 and 12A.

A case will be considered in which 2 copies of a document consisting of 3 pages are obtained.

Figure 11:
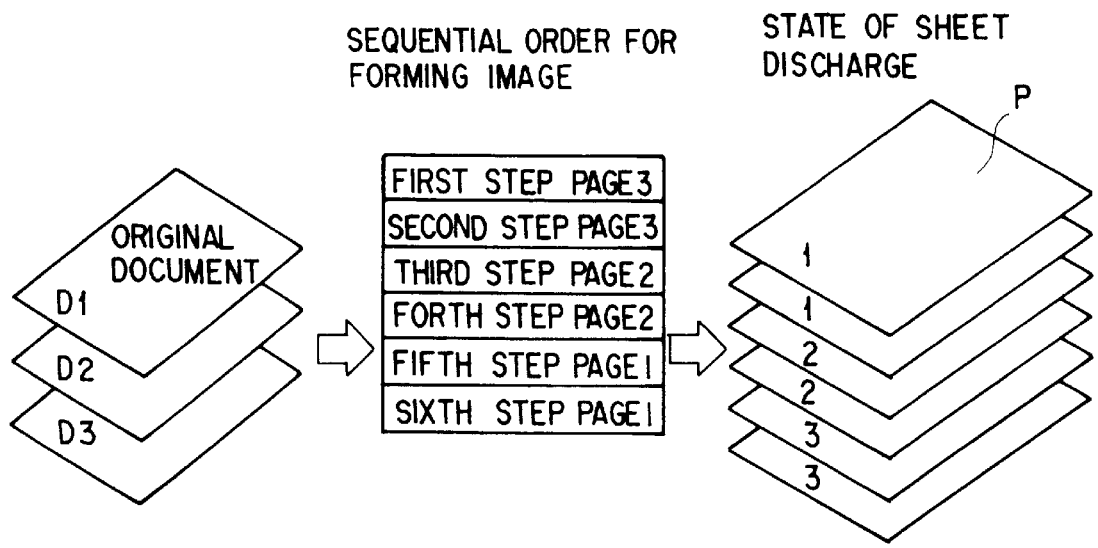
FIG. 11 is a diagram for explaining a copying operation without a sorting mode.

When a copying operation is performed without sorting, the original document D is, as shown in FIG. 11, conveyed from the ADF 7 to the original document reading position in a sequential order as sheets D3, D2 and D1. Then, combination of the operation for reading the original document performed by the scanner portion 4 and the printing operation performed by the printer portion 6 causes images to be formed on the copying paper P in the sequential order of page 3, page 3, page 2, page 2, page 1 and page 1. The sheets of the copying paper P on which images have been formed are stacked onto the finisher discharge tray 154 in a sequential order as page 1, page 1, page 2, page 2, page 3 and page 3.

Figure 12A:
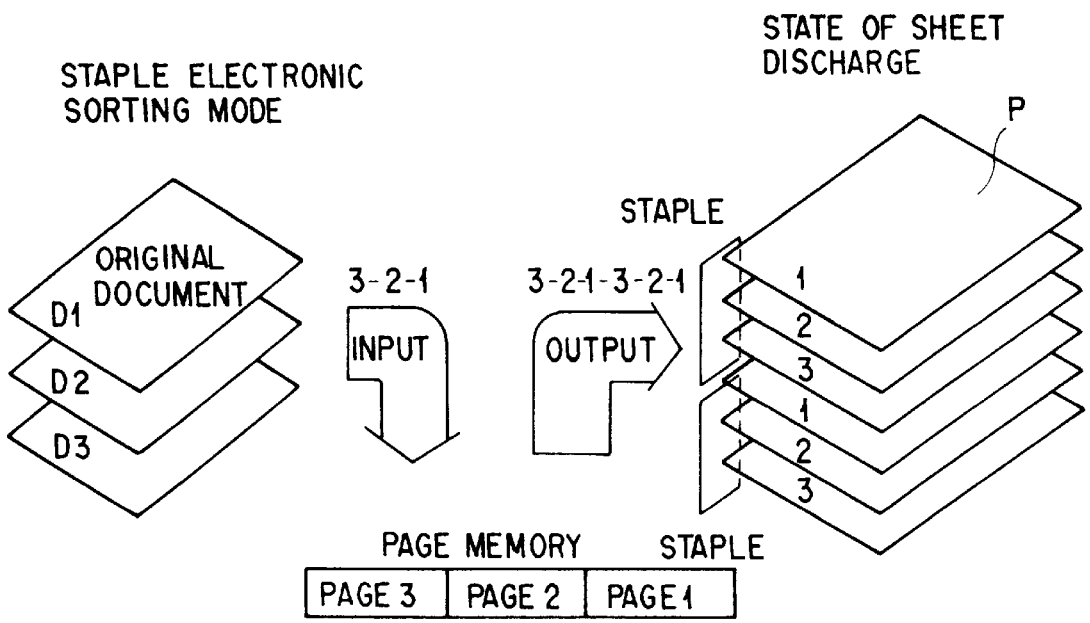
FIG. 12A is a diagram showing a copying operation in a electronic staple sorting mode.

When a copying operation is, as shown in FIG. 12A, performed in the electronic staple sorting mode, the original document D is conveyed from the ADF 7 to the original document reading position in a sequential order as page D3, page D2 and page D1. Then, the images are, by the scanner portion 4, read into the page memory 323 in the sequential order as page 3, page 2 and page 1. Then, pages 3, 2 and 1 are, in this sequential order, output from the page memory 323 to the printer portion 6, and then stapled and discharged to the finisher discharge tray 154. The copying paper P discharged to the finisher discharge tray 154 has been stabled in the sequential order as page 1, page 2 and page 3. Thus, the operator is able to obtain two stapled copies of the document.

Then, a delay interruption process which is a characteristic of the present invention and which is performed when the electronic sorting mode is performed will now be described with reference to a timing chart shown in FIG. 12B. FIG. 12B is the timing chart showing the relationship between the delay interruption operation, which is the characteristic of the present invention, and the electronic sorting mode process.

FIG. 12B shows timing of a process when an operation is performed in the electronic staple sorting mode to copy original document sheets D1, D2 and D3 to obtain a plurality of copies. That is, printing 407 of the original document sheets D1, D2 and D3 is performed so that a first copy is obtained. Then, stapling 409 of the three printed sheets is performed by the finisher 150. Then, printing 411 and stapling 413 of the second copy are performed. A interruption process 401 has been instructed at a moment after printing of the original document sheet D1 has been completed and when printing of the original document sheet D2 starts during printing of the third copy.

With the conventional structure, the interruption process is immediately performed so that the original document sheet D4 is printed. Then, the original document sheet D4 is discharged to the tray to follow the original document sheet D1. As a result, the sheets printed in the electronic sorting mode and the sheets obtained by the interruption printing are unintentionally stapled or the sheets printed in the electronic sorting mode are disordered by the sheets printed due to the interruption printing operation.

However, the delay interruption process, which is the characteristic of the present invention is arranged such that the interruption process is not performed simultaneously with interruption 401. That is, simultaneously with the interruption 401, an interruption flag is turned on so that a standby state starts such that waiting while turning on the interruption flag is continued until one copy is printed in the electronic sorting mode (415), the sheets in the copy are completed (417) and the printing operation in the electronic sorting mode is suspended (419). Then, the interruption process is performed (405). In this case, the original document sheets D1, D2 and D3 are stapled, and then the operation for printing the interruption original document sheet D4 is completed, followed by being discharged. Therefore, the problem experienced with the printing operation which is performed in the conventional electronic sorting mode such that different sheets are collectively stapled can be prevented.

Figure 16:
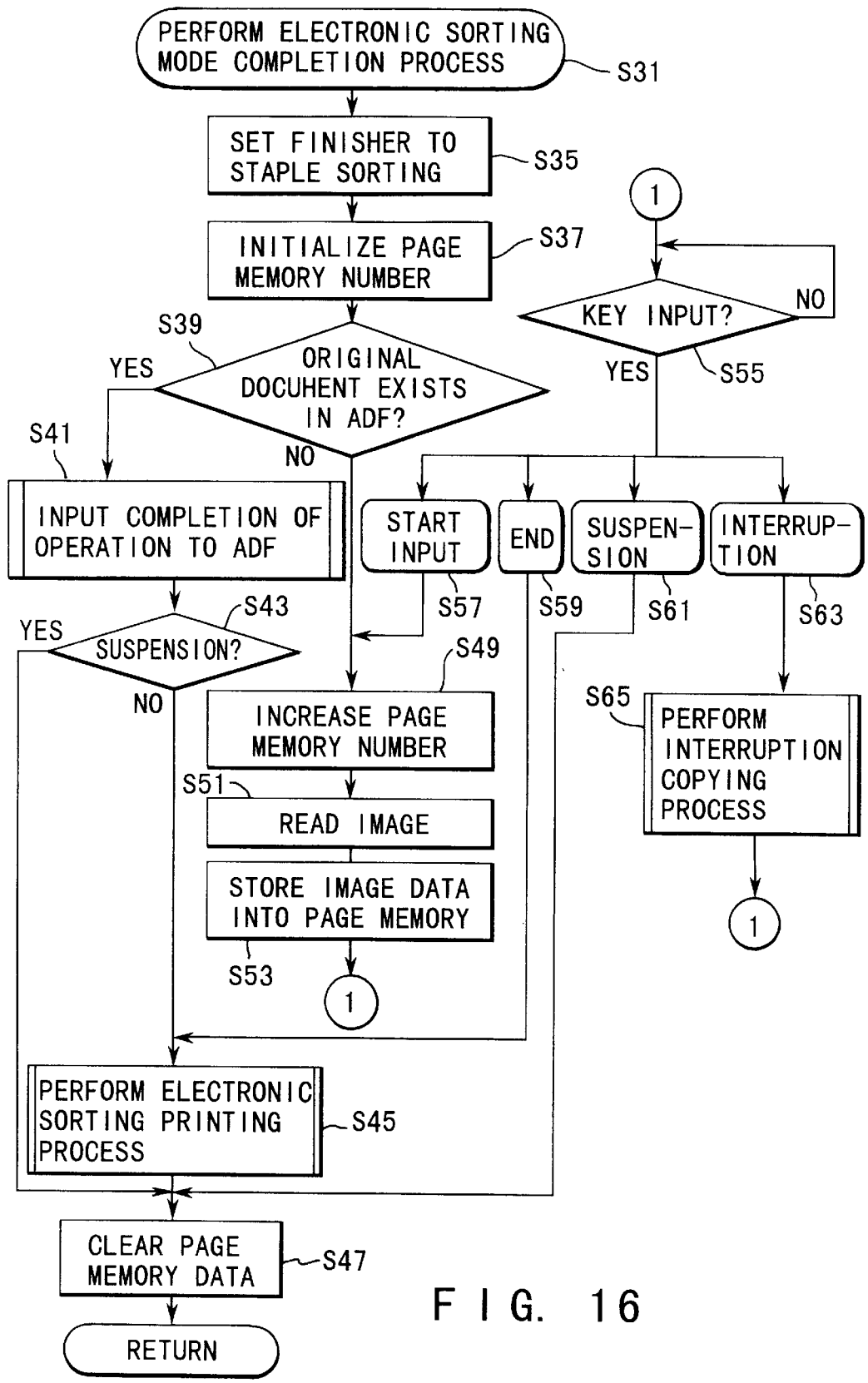
FIG. 16 is a flow chart for explaining a process for completing the electronic sorting mode.

Note that the delay interruption operation, which is the characteristic of the present invention, made to be apparent in the flow chart for the printing operation in the electronic sorting mode which is the sub-routine of the flow shown in FIG. 16. The foregoing operation is realized by omitting detection of the interruption process in FIGS. 20 and 21. Other flow charts below are similar to those of the conventional structure. Note that the example shown in FIG. 16 is an example of a structure for realizing the delay interruption shown in FIG. 12B and, therefore, a similar effect can, of course, be obtained with a variety of aspects by realizing the operation timing shown in FIG. 12B.

The overall operation of the digital copying machine including the first embodiment of the present invention will now be described with reference to flow charts shown in FIGS. 13 to 21.

Referring to the flow chart shown in FIG. 13, a main process (S1) will now be described.

In a case where an operator has depressed a key on the operation panel 80 (S2) and the key depression is performed to set an operation mode (S3), the instructed copying mode is written in the parameter table 104a (S7). Thus, the number of copies, the size of the original document, the size of the sheets, the magnification and the sorting mode are stored. Note that an assumption is performed that predetermined values have been set to the parameter table 104a when the apparatus has been turned on. Thus, the predetermined values are employed as copying parameters, which are not instructed.

When the copy key 82 on the operation panel 80 is depressed (S5), the copying operation is performed (S11).

Note that another process (S9) is a process which does not correspond to the copying operation and the operation for setting the copying mode, the another process (S9) including a process for setting a timer and a pre-heating process.

The copying operation (S11) will now be described with reference to the flow chart shown in FIG. 14.

The operation of a digital copying machine of the type according to this embodiment and having the page memory 323 to enable the operation in the electronic sorting mode to be performed is mainly divided into an electronic sorting mode operation in which images are stored in the page memory 323 and the images are printed in the sorting mode; a memory copying operation in which images are temporarily stored in the memory so as to be printed as it is; and a normal copying operation in which the memory is not used and the supplied images of the original document are directly printed. Thus, the type of the set copying process is determined when the copying operation starts to perform the set copying operation.

That is, a reference is made to the parameter table 104a (S13) to determine whether the electronic sorting mode is valid (S15). If a determination has been performed that the electronic sorting mode is valid, the electronic sorting mode process is performed (S19).

If the electronic sorting mode is invalid, whether the memory copying operation is valid is determined (S17). If a determination has been performed that the memory copying operation is valid, the memory copying process is performed (S23). If the memory copying operation is invalid, the normal copying process is performed (S21).

The normal copying process is performed such that output denoting the result of the operation of reading the original document D performed by the CCD sensor 34 of the scanner portion 4 is not stored in the page memory 323 but it is printed out by the printer portion 6. If five copies are intended to be obtained, the original document D is required to be scanned five times.

Figure 15:
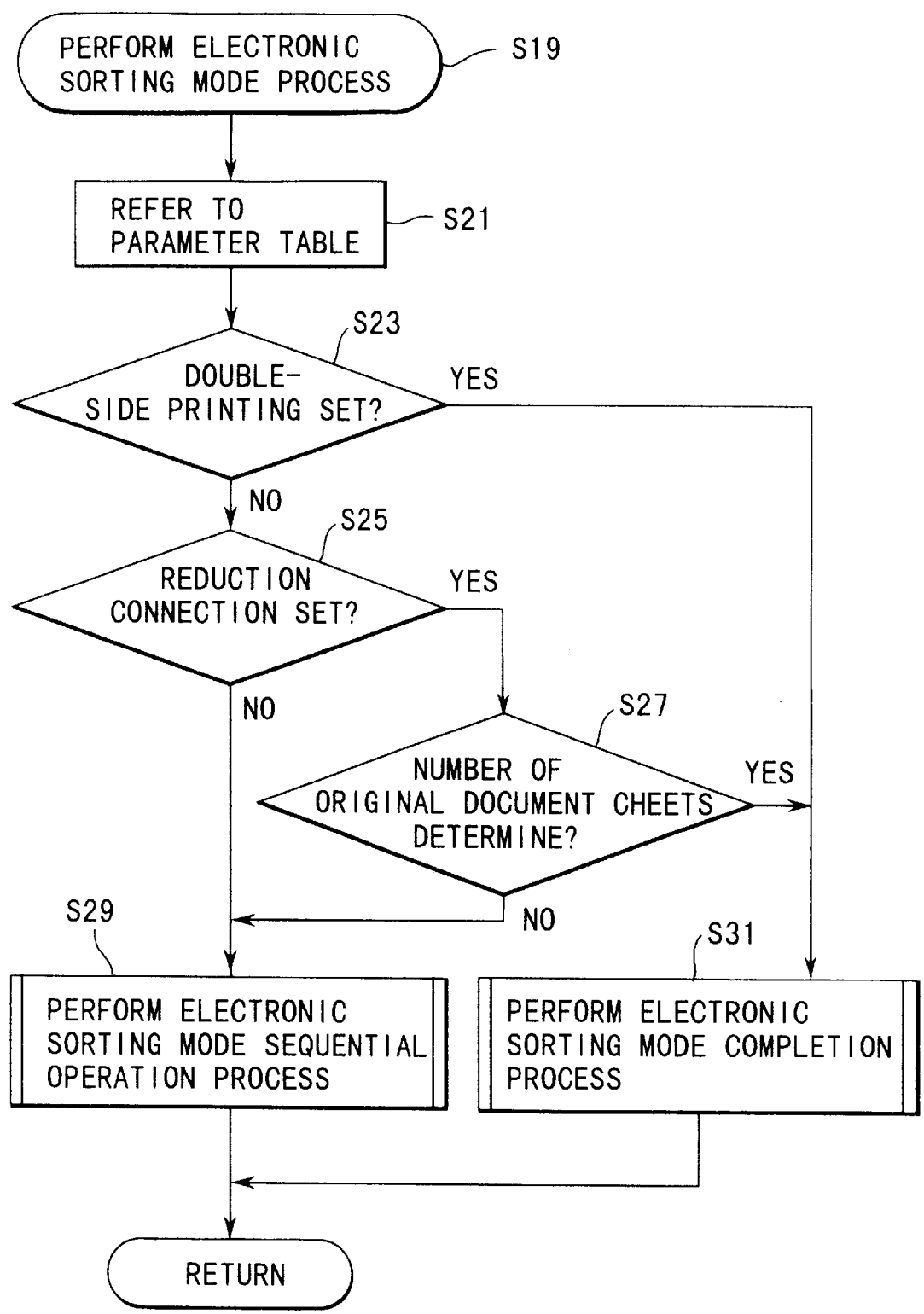
FIG. 15 is a flow chart for explaining an electronic sorting mode process.

The electronic sorting mode process (S19) will now be described with reference to a flow chart shown in FIG. 15.

Initially, a reference is made to the parameter table 104a (S21). If the double-side printing has been set, or if a contraction and connection mode is set and setting is performed such that the number of the original document sheets to be supplied is indefinite (S23, S25 and S27), a process for completing the electronic sorting mode is performed in which all of the sheets of the original document D are read and then the printing operation is performed (S31). If another setting is performed, an electronic sorting mode sequential process is performed (S29).

In the process for completing the electronic sorting mode (S31), the original document D is sequentially read by the scanner portion 4, read image data is stored in the page memory 323, and after image data of all sheets of the original document D have been stored in the page memory 323, image data stored in the page memory 323 is sequentially read (by, for example, changing the sequential order of the pages) to print out the image by the printer portion 6.

In the electronic sorting mode sequential process, a first copy is obtained by sequentially reading the original document D by the scanner portion 4 to store read images to the page memory 323 and print out the images by the printer portion 6; and second and following copies are obtained by sequentially reading image data stored in the page memory 323 to print out the images by the printer portion 6.

The process for completing the electronic sorting mode (S31) will now be described with reference to a flow chart shown in FIG. 16.

Initially, a reference is made to the parameter table 104a to set the operation mode of the finisher 150 (S35). The finisher 150 has operation modes consisting of a sorting mode, a staple mode, a group mode and a non-sort mode. The group mode and the non-sort mode are omitted from description.

Initially, the number of the page memory 323 for reading and storing images is initialized (S37). The page memory 323 is, as shown in FIG. 10, sectioned into the page buffer region M1 on which image data of the original document D read by the scanner portion 4 is written and the file area M2 on which data obtained by compressing image data above is written and which is sectioned for each page. Thus, a reference is made to the leading address for each page of the file area in the sequential order of the numbers of the page memory 323.

When reading of the original document is commenced, the empty sensor 9 in the ADF 7 is checked (S39). If original document D exists, a process for inputting completion of the operation to the ADF is performed (S41).

If original document D does not exist, the original document D placed on the original-document retainer frame 12 is scanned by the scanner portion 4 to store page data (image data) on the page buffer region M1 (S49). Then, page data on the page buffer region M1 is compressed and stored in the file area M2, followed by writing the storage address to the page memory number (S51 and S53).

Then, key input is checked (S55). If start of input is instructed (S57), the process for inputting the original document is completed and the printing process is performed (S45). If suspension is instructed (S61), data in the page memory 323 is cleared and the electronic sorting mode process is completed (S47). If interruption is instructed (S63), the interruption copying process is performed (S65), and then the operation returns to waiting for key input. If an instruction except the foregoing is issued, a process similar to that which is performed when no key has been depressed is performed.

The process for inputting completion of the operation to the ADF (S41) will now be described with reference to a flow chart shown in FIG. 17.

A similar process to that shown in FIG. 16 is performed except, until the original document D is exhausted (S66), feeding of the original document (S67 and S69) and the operation for reading the original document (S71 and S73) being performed. However, waiting for key input during the execution is not performed. If any valid key, that is, if an instruction to perform the operation (S77)(depression of the copy key 82), interruption (S79)(depression of the interruption key 92) or suspension (S81) (depression of the suspension key displayed on the liquid crystal display portion 84) is instructed during execution, the instructed process (S83, S85, S87 or S89) is performed.

The electronic sorting mode printing process (S45) for realizing the delay interruption, which is the characteristic of the present invention, will now be described with reference to a flow chart shown in FIG. 18.

Page data stored in an instructed address of the page memory number is expanded to be developed in the page buffer region M1 (S91). Then, developed image data is printed by a set number of sheets (S99 and S101), and then key input is checked (S105).

In the case where valid interruption (S124), suspension (S125) or instruction of an operation (S126) has been instructed during the printing operation, the instructed operation is performed. If invalid operation is instructed or set, the process is performed on an assumption that no key has been depressed.

While performing the printing operation, the page number is increased (S103). After the final page has been printed (S97), the staple discharge or finisher discharge tray 154 is shifted (S107). Then, the number of copies to be printed is increased (S109).

The foregoing operation is performed until the number of copies set to the parameter table 104a is completed (S95) or until suspension is instructed (S125).

Figure 18:
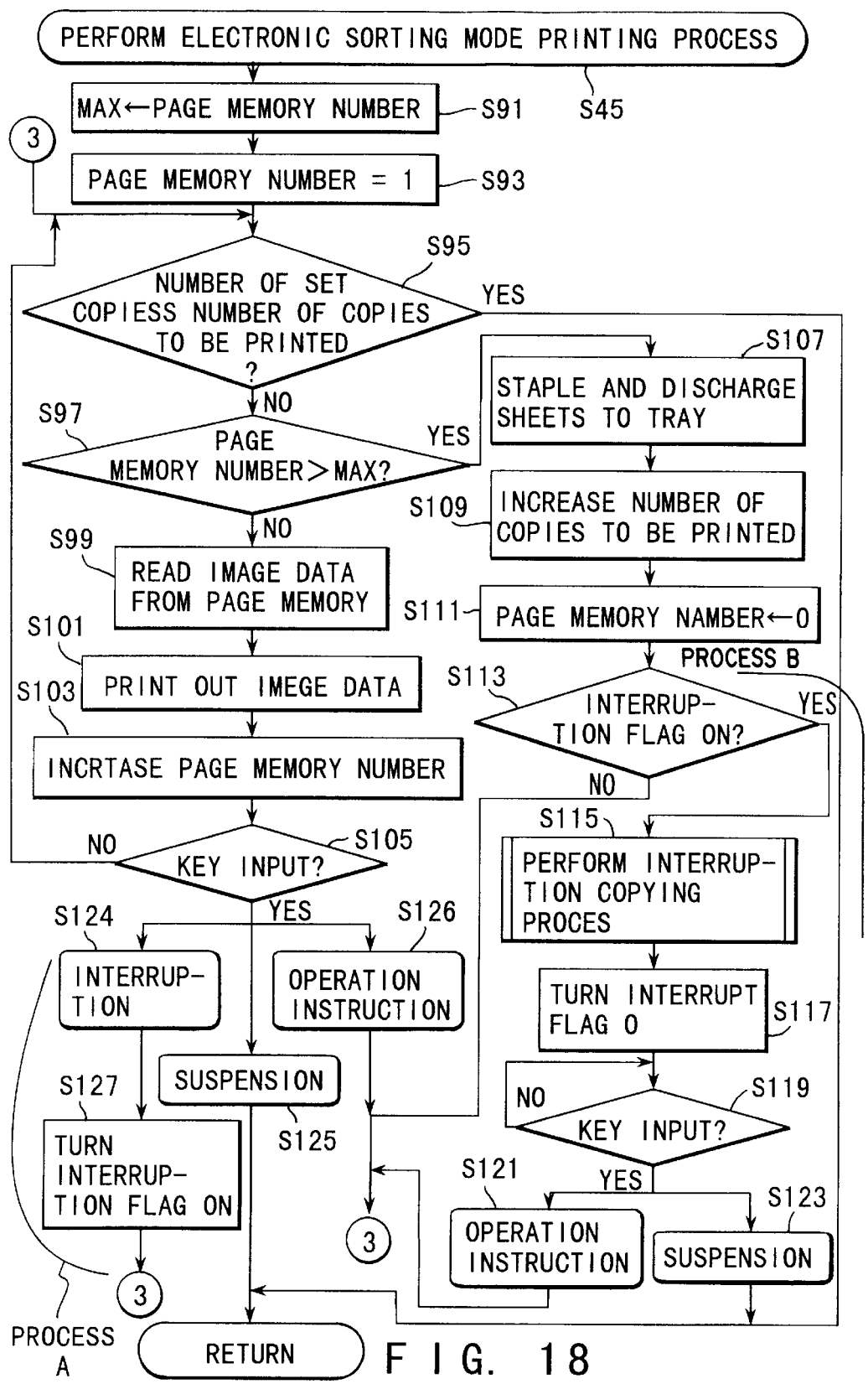
FIG. 18 is a flow chart for explaining an electronic sorting mode printing process which is the characteristic of a first embodiment of the present invention.

In process A shown in FIG. 18, interruption is not immediately performed when interruption has been instructed during the printing operation. In this process A, a flag (for example, set to the RAM 104) indicating that interruption has been instructed is simply turned on (S127). In process B, whether interruption has been instructed after the staple discharge operation has been completed is detected in accordance with a fact whether the foregoing flag has been turned on (S113). If the foregoing flag has been turned on, the interruption copying process is performed (S115). Then, the interruption flag is turned on (S117), and then key input is checked (S119, S121 and S123).

As described above, even if interruption is instructed, the interruption operation is not immediately performed. The stapling operation is performed, and then the stapled sheets are discharged to the finisher discharge tray 154 (S107). Then, the interruption copying operation is allowed to start (S115). Thus, the delay interruption, which is the characteristic of the present invention described with reference to FIG. 12B, can be realized. As a result, a problem in that sheets copied due to the interruption copying operation are mixed and stapled together with the sheets which are being stapled and discharged or that disorder in stapling takes place can be prevented.

Figure 19:
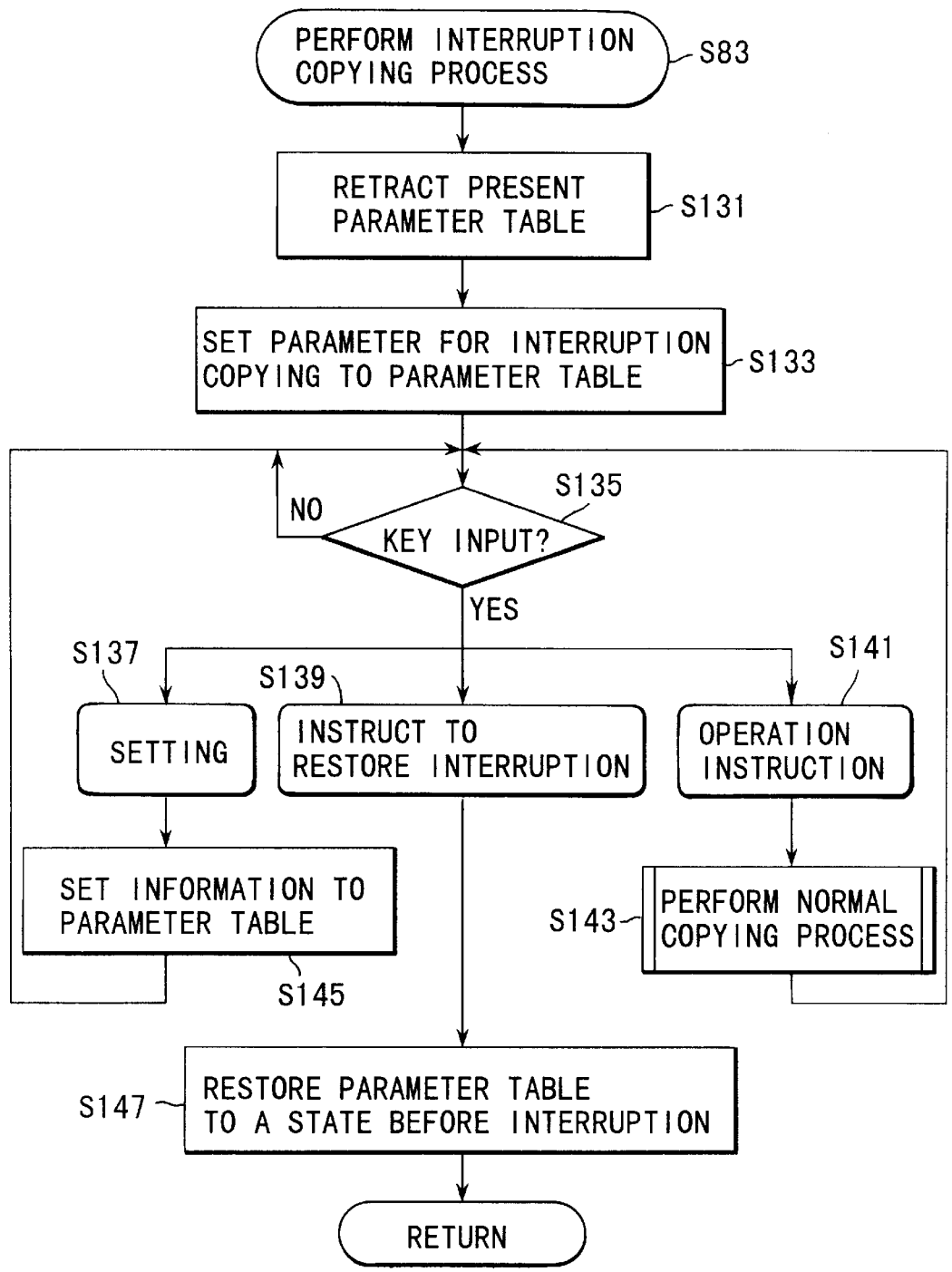
FIG. 19 is a flow chart for explaining an interruption copying process.

The interruption copying process (S83) will now be described with reference to a flow chart shown in FIG. 19.

Since the interruption copying process is performed during the previous copying operation, the present parameters in the parameter table 104a are retracted (S131) and parameters for the interruption copying operation are set to the parameter table 104a (S133). When the operation is returned from the interruption copying operation, the previous parameters are returned to the parameter table 104a. After key input (S135) has been performed to set parameters (S137 and S145), the process follows the instruction of the operation effected by key input (S141) so that the normal copying process is performed (S143). If an instruction to restore to interruption is issued (S139), the parameter table 104a is restored to a state before the interruption (S147).

The electronic sorting mode sequential process (S29) will now be described with reference to a flow chart shown in FIG. 20.

The process to be performed from a moment at which images are read to a moment at which the read images are stored in the memories corresponding to the page memory numbers (S151, S153, S155, S161, S163 and S165) is the same as that in the flow chart shown in FIG. 16.

Then, page data stored at the instructed address of the page memory number is expanded so as to be developed on the page buffer region M1 (S167). Then, developed image data is printed (S169), and then waiting for key input is performed.

In a case where, during waiting for key input (S171), end (input of the end key displayed in the liquid crystal display portion 84) is instructed (S173), reading of the original document and printing of the first copy are completed. Therefore, in the case of the staple mode, copying paper P which is being discharged is stapled and discharged to the finisher discharge tray 154 (S177). In the case of the sorting mode, the finisher discharge tray 154 is shifted, and the counter for counting the number of copies to be printed (set to, for example, the RAM 104) is increased (S179). Then, the printing process (S181) is performed, and then the page memory 323 is cleared (S183).

Note that a process for detecting the instruction of the interruption by the key input is omitted in the process C shown in FIG. 20. Thus, the interruption operation is not performed to follow the instruction to perform interruption at the foregoing moment as has been performed with the conventional structure. Therefore, when input of the original document D and the staple printing operations are being performed, the instruction to perform interruption is not accepted. As described above, the instruction to perform interruption is not accepted in the electronic sorting mode sequential process so that sheets except those copied in the staple sorting mode are not discharged to the tray. Therefore, disorder of the electronic sorting mode printing operation can be prevented.

Figure 21:
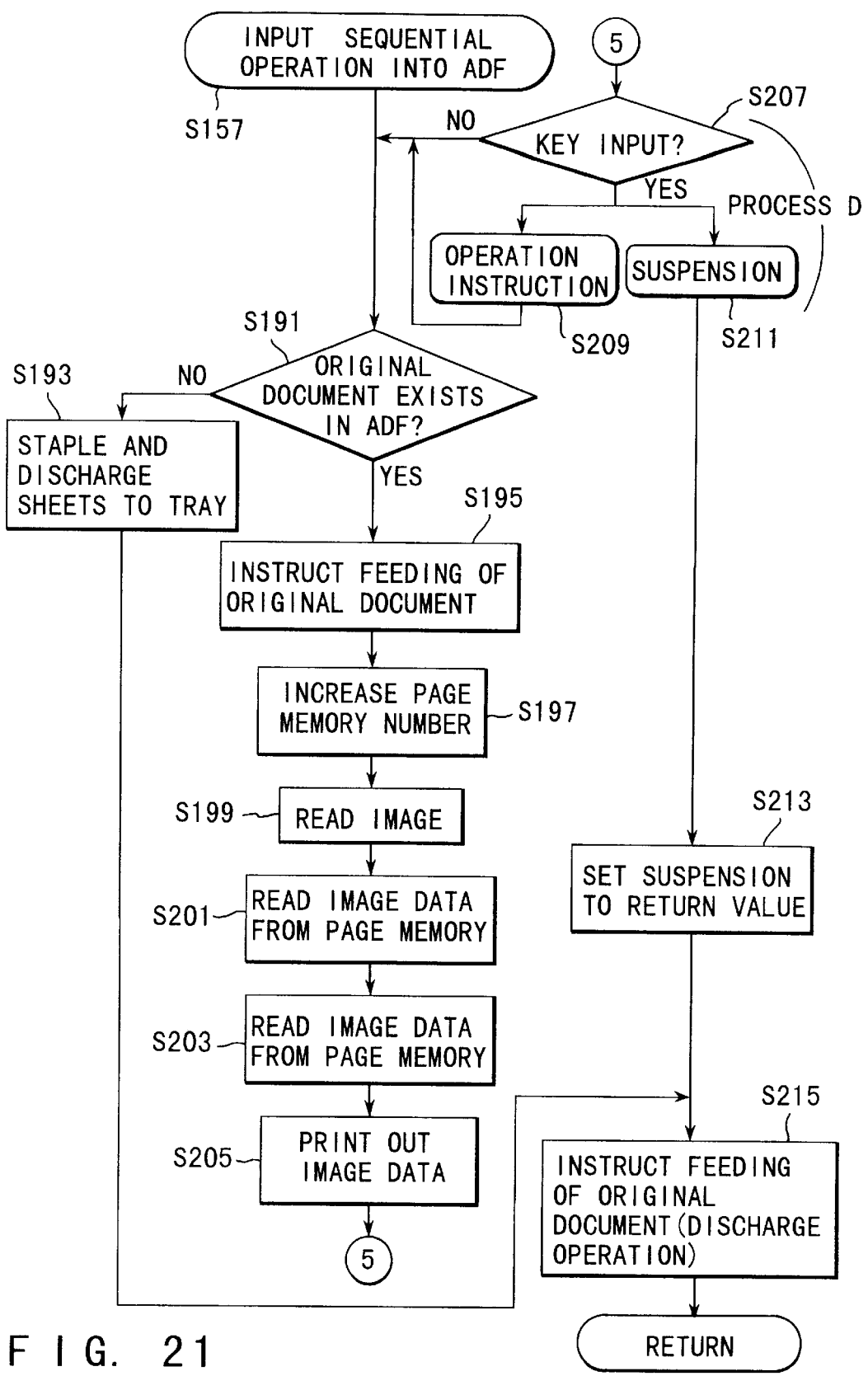
FIG. 21 is a flow chart for explaining a process for inputting sequential operation to the ADF.

The process for inputting sequential operation to the ADF will now be described with reference to a flow chart shown in FIG. 21.

A similar process to that shown in FIG. 20 is performed except, until the original document D is exhausted, feeding of the original document and the operation for reading the original document being performed. However, waiting for key input during the execution is not performed. If any valid key, that is, if an instruction to perform the operation (depression of the copy key 82), end (depression of the end key displayed on the liquid crystal display portion 84) or suspension (depression of the suspension key displayed on the liquid crystal display portion 84) is instructed during execution, the instructed process is performed.

However, when attention is paid to process D, even if interruption is instructed when key input is performed, the process is performed on the assumption that no instruction has been issued. Thus, the instruction to perform interruption is not accepted when input of the original document D and the staple printing operation are being performed. Since the interruption is not accepted as described above, discharge of copying paper except that printed in the staple sorting mode is prevented.

As described above, if interruption is instructed during a period in which only input of original document in the electronic staple sorting mode is being performed, the interruption copying process is performed. The instruction to perform performed during a process in which the printing operation is performed while inputting the original document is made to be invalid and the interruption copying process is inhibited. If interruption is instructed during a process in which only the printing operation is being performed, stapling is performed and the interruption copying process is performed after discharge to the finisher discharge tray has been performed.

That is, if interruption copying is instructed during the electronic staple sorting mode process, the interruption copying operation is performed after stapling for each copy has been completed.

As a result, if interruption copying is instructed during the electronic staple sorting mode process, interruption copying does not start until the stapling operation is completed. Therefore, unintentional stapling of interruption-copied sheets together with the sheets copied before the interruption is performed can be prevented. Moreover, sheets copied before the stapling operation is performed cannot be disordered by the sheets discharged as a result of the interruption copying operation.

That is, if interruption copying is instructed during the electronic staple sorting mode process, the interruption mode is not immediately allowed to start. After the process for each copy has been completed, the interruption operation is allowed to start. Thus, discharge of interruption-copied sheets on the sheets discharged due to the staple sorting mode on the same tray can be prevented. As a result, the probability that interruption-copied sheets are unintentionally stapled together with the sheets to be stapled can be prevented when the process is returned from the interruption process to continue the stapling operation. Moreover, sheets arranged so as to be stapled cannot be disordered when the interruption-copied sheets are taken from the tray.

Second to seventh embodiments, which are modifications of the present invention, will sequentially be described with reference to the drawings and flow charts.

Figure 22:
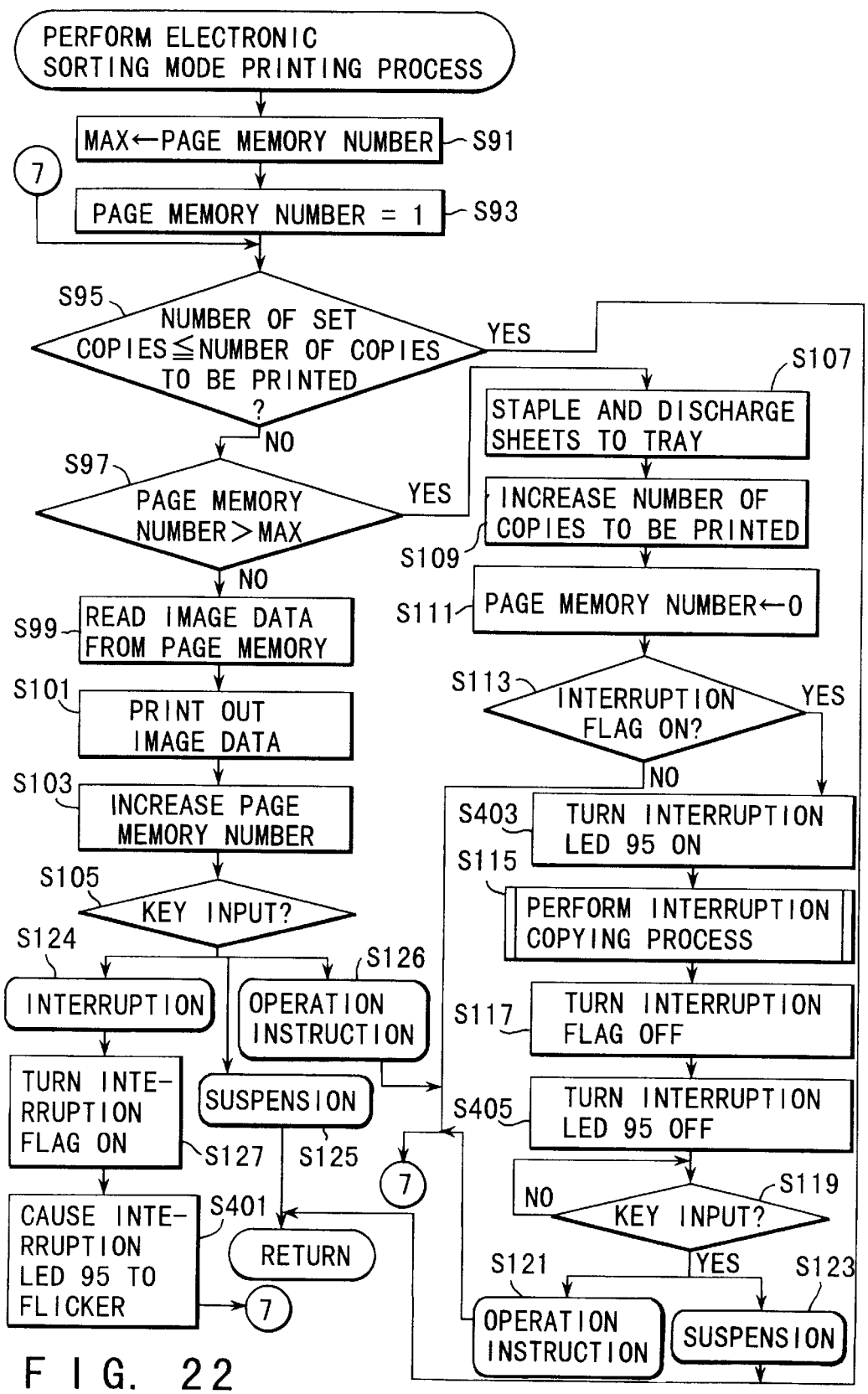
FIG. 22 is a flow chart for explaining an electronic sorting mode printing process when delay interruption according to a second embodiment is displayed by allowing an LED to flicker.
Figure 23:
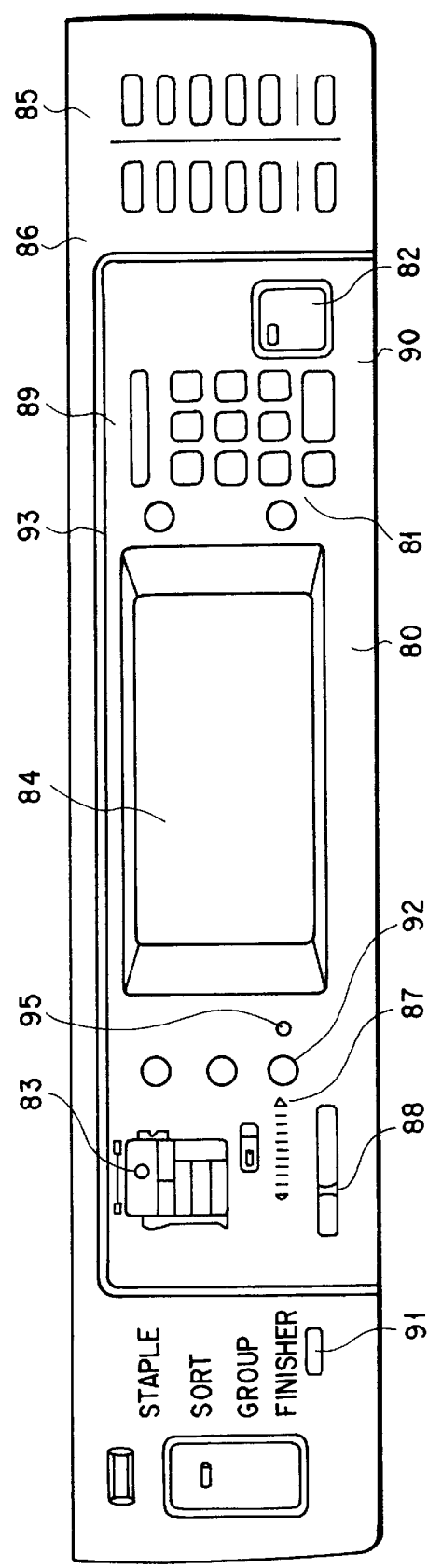
FIG. 23 is a plan view showing the structure of an operation panel according to the second embodiment and having an interruption display LED.
Figure 24:
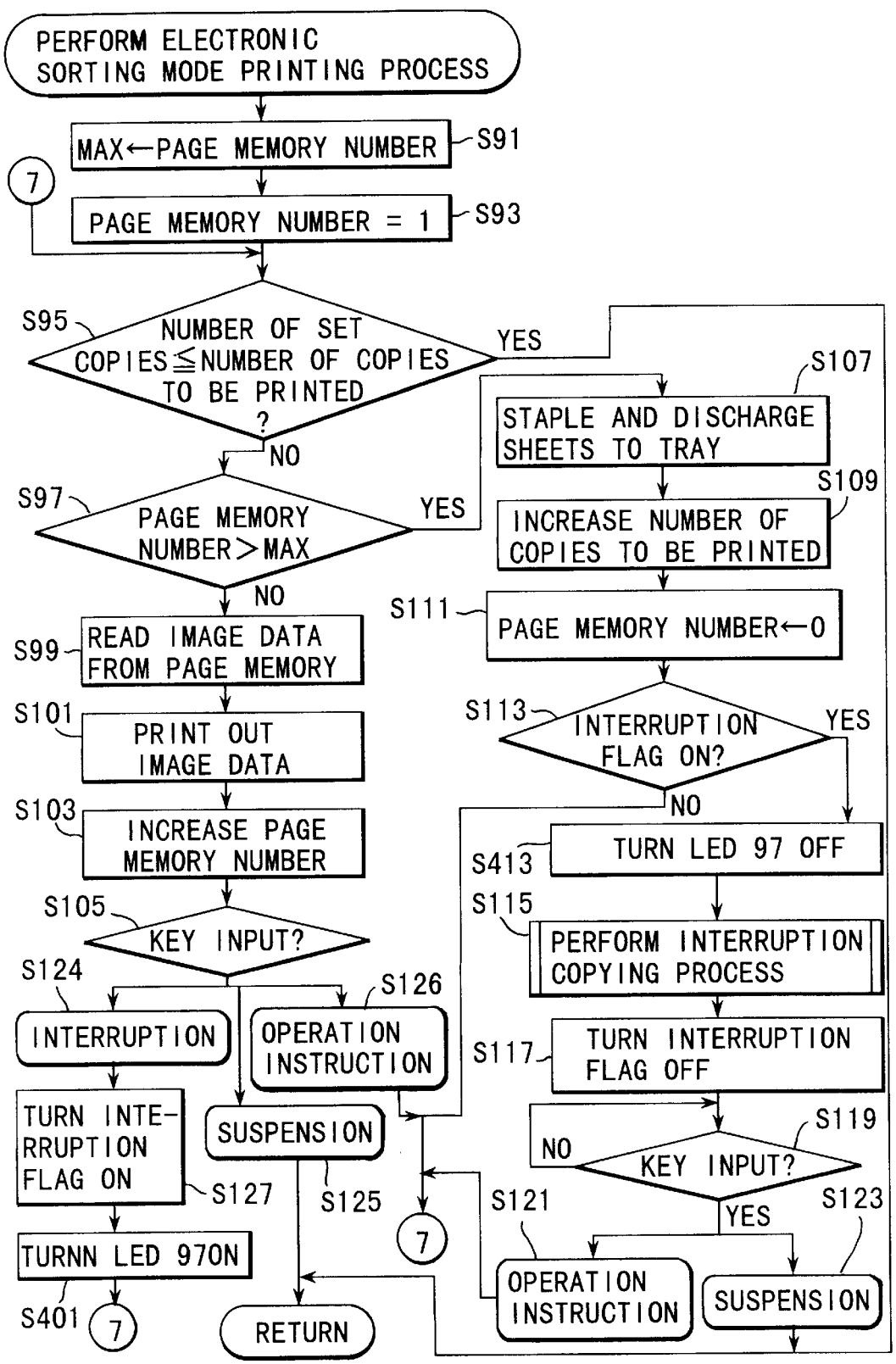
Figure 25:
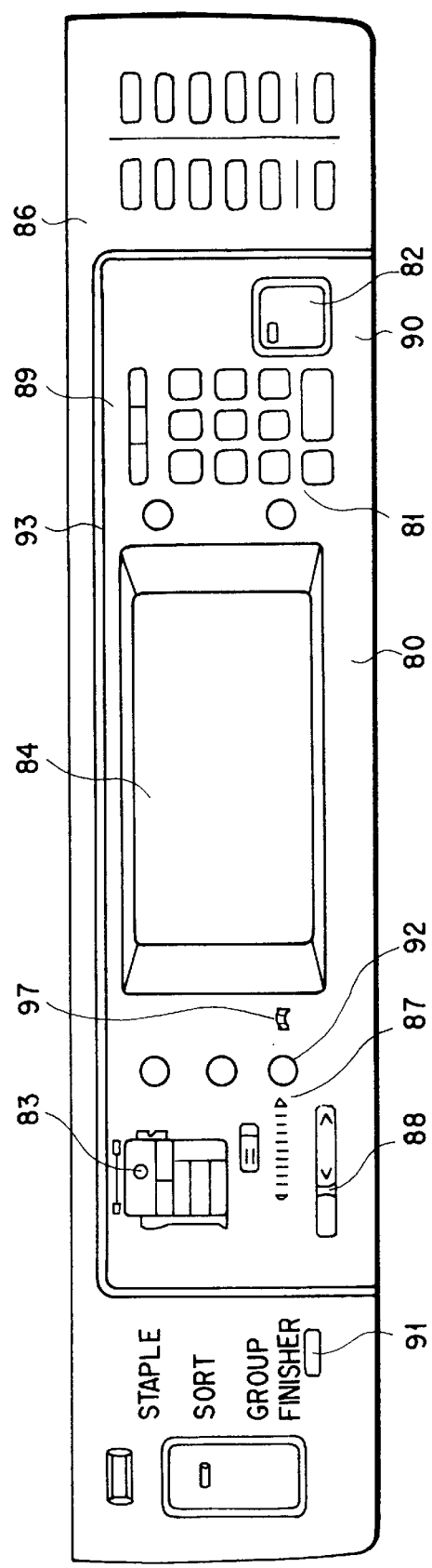
FIG. 25 is a plan view showing the structure of an operation panel according to the second embodiment and having a delay interruption display LED.

The second embodiment has a structure such that standby for interruption due to the delay interruption, which is the characteristic of the present invention is communicated to the operator. FIG. 22 is a flow chart of a process to be performed when delay interruption is displayed by flickering of the interruption display LED. FIG. 23 is a plan view showing the structure of an operation panel having an interruption display LED. FIG. 24 is a flow chart of a process to be performed when the delay interruption is displayed by turning an exclusive LED on. FIG. 25 is a plan view showing the structure of an operation panel having a delay interruption display LED.

The second embodiment is sectioned into three cases. A first case has an arrangement that an interruption LED 95 as shown in FIG. 23 is provided so as to be allowed to flicker (not turned on) to communicate the operator an intention to perform the delay interruption and that the standby for interruption is being performed.

That is, the interruption LED is turned on when the interruption process is performed due to the depression of the interruption key 92. When the delay interruption, which is the characteristic of the present invention, is performed, that is, when the standby state (refer to FIG. 12B) for completion of one copy due to the electronic sorting operation if the interruption key is depressed, the interruption LED 95 is allowed to flicker to communicate this with the operator. As a result, the operator is able to know that the interruption is not rejected but the standby for the interruption operation is performed and, therefore, the interruption operation will be performed after a predetermined time has elapsed.

Referring to the flow chart shown in FIG. 22, when an interruption flag is turned on (S127), the interruption LED is allowed to flicker (S401). When one copy has been performed in the electronic sorting mode and the interruption operation is performed, the interruption LED 95 is turned on (S403). After the interruption operation has been completed, the interruption LED 95 is turned off (S405).

A second case of the second embodiment has a structure such that standby for the interruption and that the interruption operation is being performed are displayed on the liquid crystal display portion 84 of the operation panel 80. As a result, an individual LED or the like may be omitted to display information about the delay interruption.

A third case of the second embodiment has a structure such that an exclusive LED 97 for indicating that standby for the delay interruption is being performed is provided as shown in FIG. 25. When the standby for the delay interruption is being performed, the LED 97 is turned on to communicate this with the operator. Thus, the fact that the standby is being performed can be notified to the operator more clearly.

Figure 26:
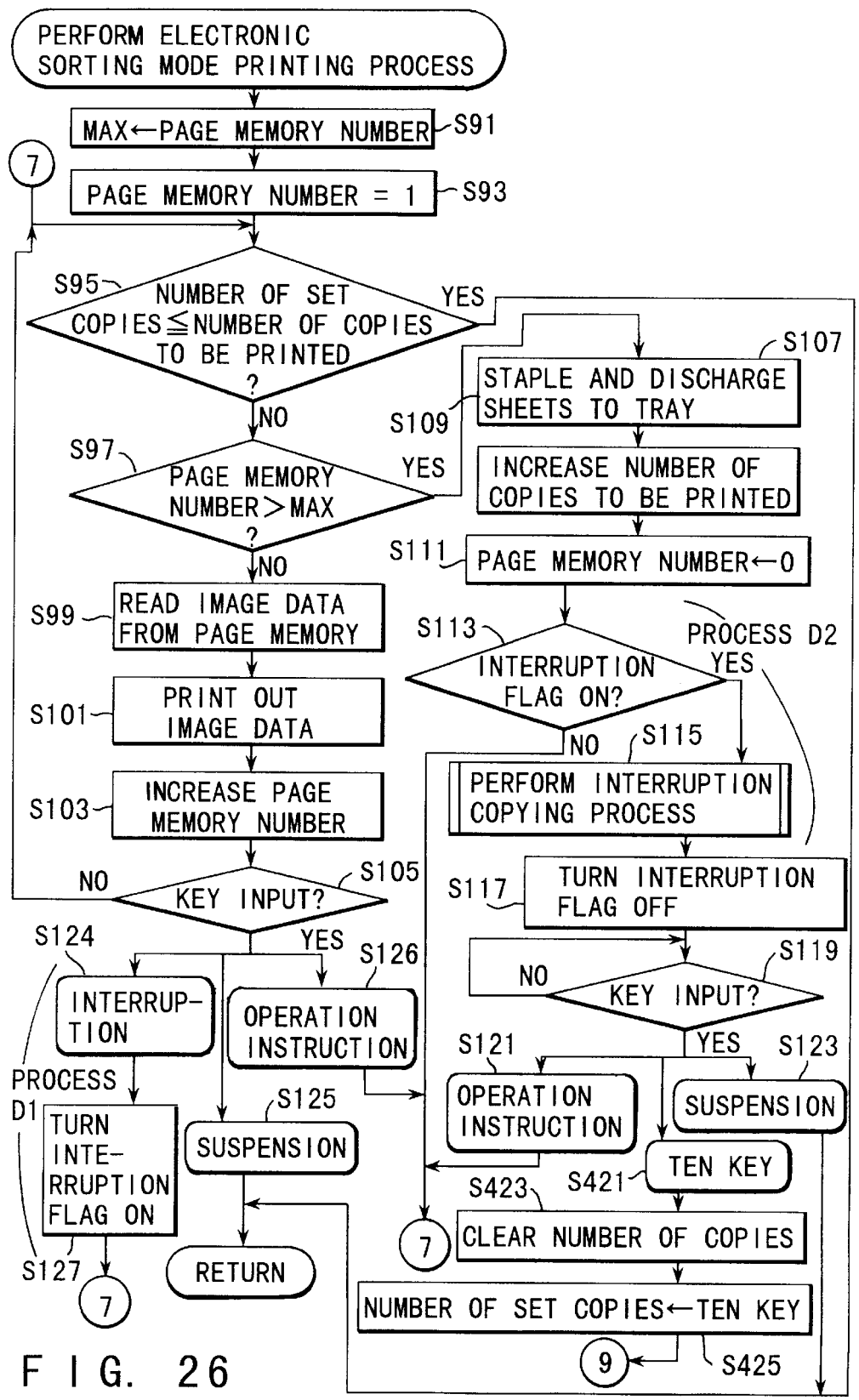
FIG. 26 is a flow chart for explaining a process according to a third embodiment for again setting the number of copies after the process has been restored from the interruption.

The third embodiment has a structure such that the number of copies to be printed is again set when the delay interruption operation has been completed and the electronic sorting mode is again restored. FIG. 26 is flow chart showing a process according to the third embodiment in which the number of copies is again set after the process has been returned from the interruption operation.

Referring to FIG. 26, the interruption copying process is performed (S115), and then the interruption flag is turned on (S119). If input by using the ten key pad has been performed (S421), the number of copies to be printed is cleared (S423) so that the number of copies is changed to the number input by using the ten key pad (S425).

Since the foregoing process is provided, even if the electronic sorting mode process is somewhat affected due to the interruption process, an opportunity is given to the operator to again set the number of copies to be printed. Therefore, the electronic sorting mode process can be performed further reliably.

A fourth embodiment has a structure such that the interruption process is performed from, for example, a host computer through a telephone line so as to perform the delay interruption process according to the present invention is performed.

Figure 27:
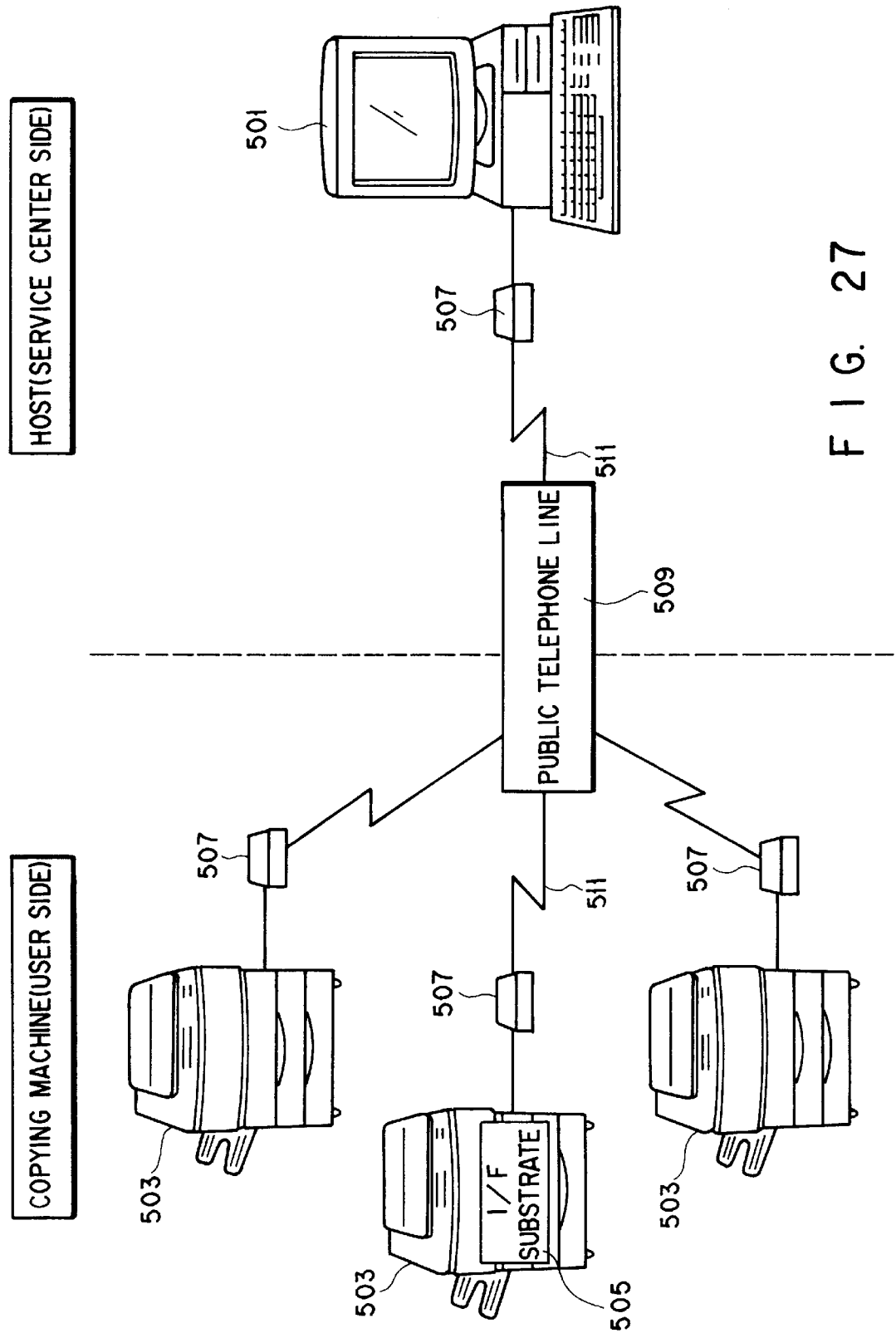
FIG. 27 is a diagram showing a network system according to a fourth embodiment for use when an interruption instruction is performed from a host computer through a telephone line.

FIG. 27 is a diagram showing a network system capable of instructing the interruption from the host computer through a telephone line. FIG. 28 is a block diagram showing a digital copying machine having mechanism capable of accepting the instruction to perform the interruption through the telephone line.

Referring to FIG. 28, a digital copying machine 503 has an image processing portion 601 for mainly processing image data, a control panel portion 605 to be operated by an operator, a printer controller portion 607 for controlling the printer by means of a personal computer or the like, and a mechanical portion 617 having a scanner motor and so forth. The foregoing units are controlled by an MCPU 609 and an SMCPU 611. Moreover, a communication portion 603 is provided for communicating image data and so forth with a host computer 501 through the telephone line. As a result, for example, image data and interruption command date are received from the host computer 501 through the telephone line. In accordance with received image data, the digital copying machine according to the present invention perform the foregoing delay interruption if the electronic sorting mode process is being performed. Thus, the electronic sorting mode printing operation and the interruption printing operation can reliably be performed from a remote area.

The fifth embodiment has a structure such that an A4R-size sheet cassette is applied to a longitudinal A4-size sheet cassette when the original electronic sorting mode printing operation is performed after the delay interruption process has been performed.

Figure 29:
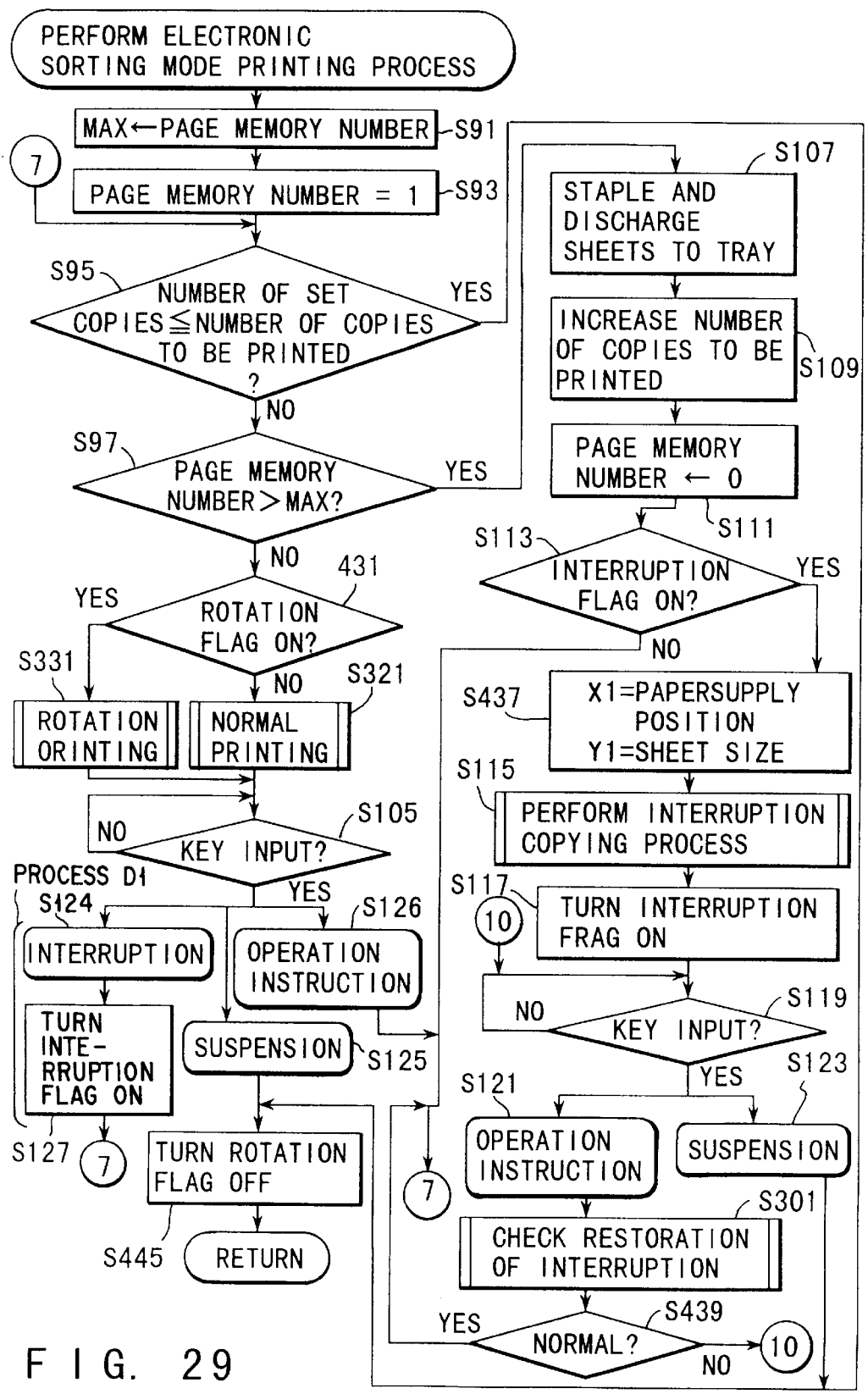
FIG. 29 is a flow chart for explaining a process according to a fifth embodiment and to be performed when a rotation process is performed after the interruption process has been performed.

FIG. 29 is a flow chart of a rotation operation to be performed after the interruption process has been performed. FIG. 30 is a flow chart of a sub-routine of an interruption restoration checking operation. FIG. 31 is a flow chart of a sub-routine of a normal printing process. FIG. 32 is a flow chart of a sub-routine of a rotation printing process.

The fifth embodiment is adaptable to a case where a longitudinal A4-size sheet cassette has been changed to a B4-size sheet cassette by an operator due to an interruption printing operation with the B4-size during the electronic sorting mode printing operation is performed with, for example, the longitudinal A4-size. In this case, the conventional structure has been arranged such that when the previous electronic sorting mode printing operation has been restored after the interruption printing operation has been completed, an alarm, for example, "MOUNT SHEET CASSETTE", is displayed on the liquid crystal display of the control panel because the longitudinal A4-size sheet cassette has been removed due to the change. Thus, the copying operation is completed. However, the fifth embodiment has a structure such that whether the A4R-size sheet cassette has been mounted on the body is detected. If the cassette has been mounted, image data is rotated to print images on the sheets (Z) in the A4R sheet cassette. Thus, the operator is not urged to change the cassette and the printing operation is automatically continued. As a result, the operation for the operator to change the cassette can be omitted and the electronic sorting mode printing operation can smoothly be performed.

Referring to FIG. 29, the flow chart shown in FIG. 18 is changed partially so that the automatic change of the sheet cassette is realized. That is, when the interruption printing operation is performed during the electronic sorting mode process, the paper supply position and the size of the sheets are stored (S437). After the interruption printing operation has been completed, whether restoration from the interruption is enabled is confirmed in accordance with the sub-routine (S301) shown in FIG. 30. If change of the sheet cassette is required, a rotation flag is turned on (S313).

Then, if the operation is normal (S439), the previous electronic sorting mode printing operation is restored and the rotation flag is confirmed (S431). If the rotation flag has been turned off, the normal printing operation is performed (S321). If the rotation flag has been turned on, the rotation printing operation is performed (S331) and the rotation flag is turned off (S445). As a result, the image is rotated so that images, the horizontal direction and the longitudinal direction of which are changed, are printed to the sheets, the horizontal direction and the longitudinal direction of which are changed. Thus, a required electronic sorting mode printing operation can automatically be performed without the necessity for the operator to change the sheet cassette.

Referring to FIG. 30, restoration from the interruption is checked (S301) by determining the size before the interruption and that after the same has been performed (S303 and S305). If the sizes are the same, normal is set (S315). If the sizes (and the directions) are changed, a determination is performed that the cassette has been changed by the operator due to the interruption operation so that whether the sheets, which have been used before the interruption operation, exist in another sheet cassette is confirmed (S307). If the sheets exist, a determination is performed that the state is normal. If the sheets do not exist, the following process is performed: if the required sheets can be rotated (S309), and if the rotated sheets (Z) exist in another cassette (S311), the rotation flag is turned on (S313). If the sheets, which can be rotated, do not exist and the sheets before and after the interruption are different from one another, a determination is performed that the state is abnormal (S317).

A normal printing operation (S321) shown in FIG. 31 is performed such that expansion of the foregoing image data items (S323 and S325), storage of the same into the page buffer (S327) and the operation for printing image data (S329) are sequentially performed.

A rotation printing operation (S331) shown in FIG. 32 is performed such that the buffer 1=Y2 size (S333) and buffer 2=Y1 size (S335). Image data expended and stored in the buffer 2 (S337) is rotated such that the horizontal and longitudinal directions are changed so as to be copied to the buffer 1 (S339). As a result, the rotated images in the buffer 1 are printed on the sheets, the horizontal and longitudinal directions are changed so that a required printing operation is performed without a necessity for the operator to change the cassette.

The sixth embodiment is characterized in that the interruption printing operation is not performed even if the interruption is instructed in a case where double side stacking is performed in the electronic sorting mode printing operation is performed.

Figure 33:
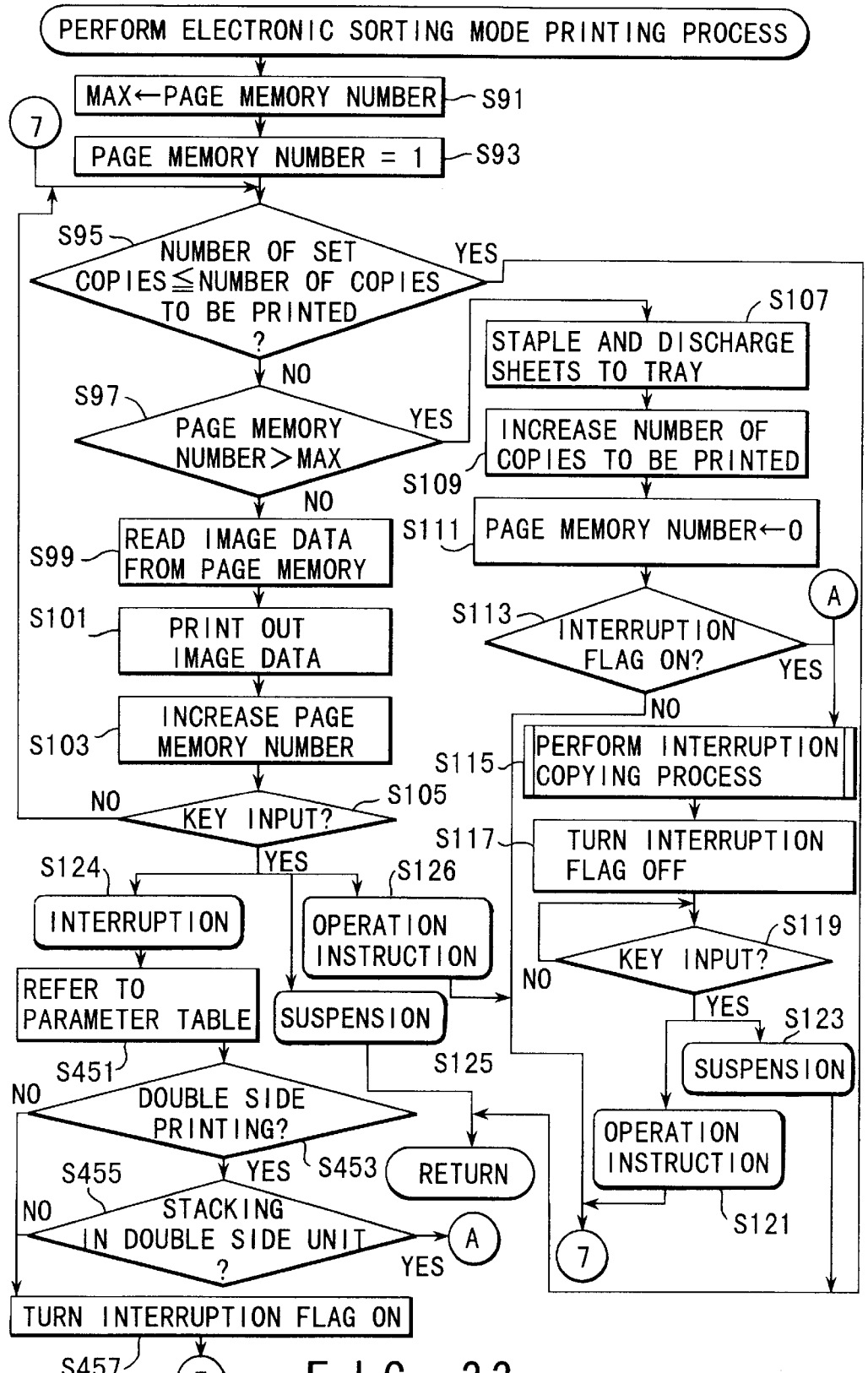
FIG. 33 is a flow chart for use when the delay interruption is not performed during the stacking of double-side according to a sixth embodiment.

FIG. 33 is a flow chart showing the sixth embodiment in which the delay interruption is not performed during the double-side stacking operation. That is, also this flow chart is basically the same as that for the foregoing electronic sorting mode printing process. Even if key input is performed during the printing operation to instruct the interruption, the interruption flag is not turned on if the double-side printing operation is being performed and sheets are being stacked in the double-side unit (S453, S455 and S457). Therefore, the interruption operation is not performed during the double-side stacking operation. Thus, an electronic sorting mode printing operation capable of reliably performing the double-side stacking operation can be performed.

The seventh embodiment has a structure such that: in a case where stapling is not performed during the electronic sorting mode printing operation, sheets printed in the electronic sorting mode and sheets printed due to the interruption process are discharged to different trays.

As a result, a problem of unintentional mixture of the sheets printed in the electronic sorting mode and the sheets printed due to the interruption process taking place even if the stapling operation is not performed can be prevented.

The eighth embodiment has the structure similar to the foregoing embodiment in which the interruption printing operation is performed when one copy has been made in the electronic sorting mode if the interruption is instructed during the electronic sorting mode printing operation. However, an operation for inputting the original document to be interruption-printed is immediately performed and the image of the original document is stored in the page memory. When the interruption printing operation is enabled, the image of the original document stored in the page memory is printed. As a result, the operation for inputting the image of an original document to be quickly interruption-printed can be performed.

As described above, according to the present invention, even if the interruption copying operation is instructed during the electronic staple sorting mode process, the interruption printing operation is not performed until the staple operation for one copy unit is completed. Therefore, the problems can be prevented which take place in that sheets printed due to the interruption printing operation are unintentionally stapled with the sheets printed by the electronic sorting mode printing operation and that the sheets which are being stapled are disordered by the sheets discharged due to the interruption printing operation.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image forming apparatus comprising:
   means for reading and storing a plurality of first images on a plurality of documents;
   means for forming images in a sorting mode so that the first images are formed on a plurality of mediums so as to output a plurality of groups, wherein each group comprises a plurality of mediums on which the first images are formed in an order corresponding to the documents read by the reading and storing means, whereby the first images are formed and outputted as images on the mediums for every one of the groups repeatedly;
   means for supplying an instruction so that the image forming means performs an interruption process which is a forming of a second image; and
   means for controlling the image forming means corresponding to the instruction so that a standby for the interruption process is performed during output of one of the plurality of groups, and forming of the plurality of first images is suspended and then the forming of the second image is performed after the output has been completed.

2. An image forming apparatus according to claim 1, further comprising:
   means for displaying a standby state by allowing an LED to flicker during standby for the interruption process caused by the controlling means; and
   means for displaying execution of the interruption process by turning the LED on during the interruption process.

3. An image forming apparatus according to claim 1, further comprising:
   means for displaying a standby state on a liquid crystal display of a control panel during standby for the interruption process under control of the controlling means.

4. An image forming apparatus according to claim 1, further comprising:
   means for displaying a standby state by turning a LED on during standby for the interruption process caused by the controlling means.

5. An image forming apparatus according to claim 1, further comprising:
   means for again setting number of copies to be made in the sorting mode after the image forming means has completed forming of the second image, which is the interruption process, under control of the control means.

6. An image forming apparatus according to claim 1, further comprising:

means for performing the interruption process by receiving a second image for the interruption process and the interruption instruction from an external unit.

7. An image forming apparatus according to claim 1, further comprising:

means for performing communication by receiving the second image for the interruption process and the interruption instruction from an external unit through a telephone line and a modem; and means for controlling the image forming means corresponding to the second image and the interruption instruction supplied from the performing communication means so that standby for the interruption process is performed during output of one of the plural groups, and forming of the plural first images is suspended and then forming of the second images for the interruption process is performed after the output has been completed.

8. An image forming apparatus according to claim 1, further comprising:

means for rotating the first images to form the first images on the second image forming mediums when the first image forming mediums which have been used in image forming in the sorting mode are not connected to the image forming apparatus, the first images can be rotated, and second image forming mediums having different direction as that of the first image forming mediums and the same size as that of the first image forming mediums are connected to the image forming apparatus after the image forming means has formed the second images of the interruption process under control of the controlling means.

9. An image forming apparatus according to claim 1, further comprising:

means for controlling the image forming means to inhibit the interruption operation even if the interruption instruction is issued, when the image forming means forms image in the sorting mode, the image forming means forms the images on the both sides of the image forming mediums and the image forming mediums are temporarily stacked and stored.

10. An image forming apparatus according to claim 1, wherein the image forming means includes means for supplying the image forming mediums obtained in the electronic sorting mode to a first tray and supplying second image forming mediums supplied due to the interruption process to a second tray which is provided individually from the first tray.

11. An image forming apparatus according to claim 1, further comprising:

means for scanning and fetching second images of an original document to be subjected to the interruption process during the control means performs control to standby the interruption process.

12. An image forming apparatus comprising:

means for reading and storing a plurality of first images on a plurality of documents;

means for forming images in a sorting mode so that the first images are formed on a plurality of mediums so as to output a plurality of groups, wherein each group comprises a plurality of mediums on which the first images are formed in an order corresponding to the documents read by the reading and storing means, whereby the first images are formed and outputted as images on the mediums for every one of the groups repeatedly;

means for supplying an instruction so that the image forming means performs an interruption process which is a forming of a second image;

means for stapling the plurality of mediums output from the image forming means for each of the groups; and means for controlling the image forming means corresponding to the instruction so that a standby for the interruption process is performed during output and stapling of one of the plurality of groups, and forming of the plurality of first images is suspended and then forming of the second image is performed after stapling of the one of the groups has been completed.

13. An image forming apparatus according to claim 12, further comprising:

means for displaying a standby state by allowing an LED to flicker during standby for the interruption process caused by the controlling means; and means for displaying execution of the interruption process by turning the LED on during the interruption process.

14. An image forming apparatus according to claim 12, further comprising:

means for displaying a standby state on a liquid crystal display of a control panel during standby for the interruption process under control of the controlling means.

15. An image forming apparatus according to claim 12, further comprising:

means for displaying a standby state by turning a LED on during standby for the interruption process caused by the controlling means.

16. An image forming apparatus according to claim 12, further comprising:

means for again setting number of copies to be made in the sorting mode after the image forming means has completed forming of the second image, which is the interruption process, under control of the control means.

17. An image forming apparatus according to claim 12, further comprising:

means for rotating the first images to form the first images on the second image forming mediums when the first image forming mediums which have been used in image forming in the sorting mode are not connected to the image forming apparatus, the first images can be rotated, and second image forming mediums having different direction as that of the first image forming mediums and the same size as that of the first image forming mediums are connected to the image forming apparatus after the image forming means has formed the second images of the interruption process under control of the controlling means.

18. An image forming apparatus according to claim 12, further comprising:

means for controlling the image forming means to inhibit the interruption operation even if the interruption instruction is issued, when the image forming means forms image in the sorting mode, the image forming means forms the images on the both sides of the image forming mediums and the image forming mediums are temporarily stacked and stored.

19. An image forming apparatus according to claim 12, further comprising:

means for scanning and fetching second images of an original document to be subjected to the interruption process during a period in which the control means performs control to standby the interruption process.

20. An image forming network system comprising:

means for outputting an interruption instruction for causing an interruption process to be performed and a first image to be formed by the interruption process;

means for transferring the interruption instruction and the first images through a telephone line and a modem; and an image forming apparatus having;

means for reading and storing a plurality of first images on a plurality of documents;

means for forming images in a sorting mode so that the first images are formed on a plurality of mediums so as to output a plurality of groups, wherein each group comprises a plurality of mediums on which the first images are formed in an order corresponding to the documents read by the reading and storing means, whereby the first images are formed and outputted as images on the mediums for every one of the groups repeatedly;

means for stapling the plurality of image forming mediums output from the image forming means for each of the groups;

means for receiving the first images and the interruption instruction from the transferring means; and means for controlling the image forming means corresponding to the interruption instruction so that a standby for the interruption process is performed during stapling of one of the plurality of groups, and forming of the plurality of second images is suspended and then the forming of the first image is performed after the stapling operation of the one of the plurality of groups has been completed.

* * * * *